(12) United States Patent
Contavalli et al.

(10) Patent No.: US 10,454,835 B2
(45) Date of Patent: Oct. 22, 2019

(54) DEVICE AND METHOD FOR SCALABLE TRAFFIC SHAPING WITH A TIME-INDEXED DATA STRUCTURE

(71) Applicant: Google LLC, Mountain View, CA (US)

(72) Inventors: Carlo Contavalli, Redwood City, CA (US); Nandita Dukkipati, Menlo Park, CA (US); Ahmed Said Mohamed Tawfik Issa, Atlanta, GA (US); Vytautas Valancius, Redwood City, CA (US)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 15/411,341

(22) Filed: Jan. 20, 2017

(65) Prior Publication Data

US 2018/0212886 A1    Jul. 26, 2018

(51) Int. Cl.
*H04L 12/26* (2006.01)
*H04L 12/815* (2013.01)
(Continued)

(52) U.S. Cl.
CPC ............ *H04L 47/225* (2013.01); *H04L 47/22* (2013.01); *H04L 47/193* (2013.01); *H04L 47/564* (2013.01); *H04L 47/568* (2013.01)

(58) Field of Classification Search
None
See application file for complete search history.

(56) References Cited

U.S. PATENT DOCUMENTS

| 5,751,708 A | * | 5/1998 | Eng | H04L 12/2801 370/310.1 |
| 5,920,701 A | * | 7/1999 | Miller | H04L 1/1614 709/228 |

(Continued)

FOREIGN PATENT DOCUMENTS

EP          1441474 A2     7/2004

OTHER PUBLICATIONS

International Search Report and Written Opinion dated Apr. 17, 2018 in International (PCT) Application No. PCT/US2017/059385.
(Continued)

*Primary Examiner* — Kwang B Yao
*Assistant Examiner* — Juvena W Loo
(74) *Attorney, Agent, or Firm* — Lerner, David, Littenberg, Krumholz & Mentlik, LLP

(57) ABSTRACT

Systems and methods of performing rate limiting traffic shaping with a time-indexed data structure in a network device are provided. A network interface driver of the network device can received packets at the packet layer of a network host from a plurality of applications. The network interface driver can prevent one of the applications from sending additional packets for transmission until the application received a transmission completion notification indicating a packet previously forwarded to the packet layer of the network host has been transmitted. The network interface driver can process the received packets to determine a transmission time for each packet based on at least on rate limit policy. The network interface driver can store an identifier associated with the respective packet in a time-indexed data structure at a position associated with the transmission time determined for the packet. The network interface driver can determine that a time indexed in the time-indexed data structure has been reached and in (Continued)

response transmit a packet associated with the identifier stored in the time-indexed data structure at a position associated with the reached time. The network interface driver can communicate a transmission completion notification subsequent to the network interface driver transmitting the packet.

22 Claims, 16 Drawing Sheets

(51) Int. Cl.
*H04L 12/801* (2013.01)
*H04L 12/875* (2013.01)

(56) References Cited

U.S. PATENT DOCUMENTS

| | | | |
|---|---|---|---|
| 6,359,884 B1* | 3/2002 | Vincent | H04L 47/10 370/389 |
| 6,894,974 B1 | 5/2005 | Aweva et al. | |
| 7,106,693 B1* | 9/2006 | Turner | H04L 47/568 370/230 |
| 7,236,459 B1 | 6/2007 | Okholm et al. | |
| 7,349,337 B1* | 3/2008 | Mahdavi | H04L 47/193 370/230.1 |
| 2002/0163885 A1* | 11/2002 | Assa | H04L 12/5601 370/230.1 |
| 2003/0097461 A1* | 5/2003 | Barham | H04L 29/06 709/235 |
| 2003/0152096 A1 | 8/2003 | Chapman | |
| 2007/0019550 A1* | 1/2007 | Enomoto | H04L 47/10 370/235 |
| 2007/0171824 A1 | 7/2007 | Ruello et al. | |
| 2008/0112318 A1* | 5/2008 | Groleau | H04L 47/10 370/230.1 |
| 2009/0055496 A1* | 2/2009 | Garg | H04L 47/10 709/206 |
| 2009/0116381 A1* | 5/2009 | Kanda | H04L 47/10 370/229 |
| 2009/0204723 A1 | 8/2009 | Tonsing et al. | |
| 2010/0128605 A1 | 5/2010 | Chavan et al. | |
| 2011/0228697 A1 | 9/2011 | Yano et al. | |
| 2013/0077486 A1* | 3/2013 | Keith | H04L 47/2433 370/230.1 |
| 2014/0032955 A1 | 1/2014 | Boelter | |
| 2015/0043335 A1 | 2/2015 | Testicioglu et al. | |

OTHER PUBLICATIONS

International Search Report and Written Opinion dated Feb. 13, 2018 in International (PCT) Application No. PCT/US2017/060308.
Varghese, George, et al. "Hashed and Hierarchical Timing Wheels: Efficient Data Structures for Implementing a Timer Facility" IEEE/ACM Transactions on Networking, vol. 5, No. 6, pp. 824-834, Dec. 1997.
Office Action dated Sep. 19, 2018 in U.S. Appl. No. 15/411,335.
Cisco, Cisco IOS Quality of Service Solutions Configuration Guide, Release 12.2, 18 pages, 2010. Retrieved from URL: http://www.cisco.com/c/en/us/td/docs/ios/12_2/qos/configuration/guide/fqos_c/qcfpolsh.html on Jan. 20, 2017.
Kornexl, Stefan, et al. Building a Time Machine for Efficient Recording and Retrieval of High-Volume Network Traffic, In Proceedings of the 5th ACM SIGCOMM conference on Internet Measurement, pp. 23-23. USENIX Association, 2005. Retrieved from URL: http://www.icir.org/vern/papers/TimeMachine-IMC05/imc05.html on Jan. 20, 2017.
Radhakrishnan, Sivasankar, et al. SENIC: Scalable NIC for End-Host Rate Limiting, In NSDI, vol. 14, pp. 475-488, 2014. Retrieved from URL: http://cseweb.ucsd.edu/~ssradhak/Papers/senic-nsdi14.pdf on Jan. 20, 2017.
Office Action dated Apr. 1, 2019 in U.S. Appl. No. 15/411,335.

* cited by examiner

DEVICE AND METHOD FOR SCALABLE TRAFFIC SHAPING WITH A TIME-INDEXED DATA STRUCTURE

BACKGROUND

Traffic shaping is a technique that regulates network data traffic utilizing various mechanisms to shape, rate limit, pace, prioritize or delay a traffic stream determined as less important or less desired than prioritized traffic streams or to enforce a distribution of network resources across equally prioritized packet streams. The mechanisms used to shape traffic include classifiers to match and move packets between different queues based on a policy, queue-specific shaping algorithms to delay, drop or mark packets, and scheduling algorithms to fairly prioritize packet assignment across different queues. Traffic shaping systems employing these mechanisms are difficult to scale when considering requirements to maintain desired network performance for large numbers of traffic classes or when deploying traffic shaping systems in various network host architectures

SUMMARY

According to one aspect, the disclosure relates to a network device. The network device includes a network card, at least one processor, a memory, and a network interface driver. The network interface driver is configured to receive packets at the packet layer of a network host from a plurality of applications and prevent one of the applications from sending additional packets for transmission until the application receives a transmission completion notification indicating a packet previously forwarded to the packet layer of the network host has been transmitted. The network interface driver processes the received packets to determine a transmission time for each packet based on at least one rate limit policy and stores an identifier associated with the respective packet in a time-indexed data structure at a position in the time-indexed data structure associated with the transmission time determined for the packet. The network interface driver determines that a time indexed in the time-indexed data structure has been reached, and in response, transmits a packet associated with an identifier stored in the time-indexed data structure at a position associated with the reached time. The network interface driver communicates a transmission completion notification back to the application subsequent to transmitting the packet.

According to another aspect, the disclosure relates to a method. The method includes receiving by a network interface driver, packets at the packet layer of a network host from a plurality of applications and preventing, by the network interface driver, one of the applications from sending additional packets for transmission until the application receives a transmission completion notification indicating a packet previously forwarded to the packet layer of the network host has been transmitted. The method further includes processing, by a scheduling module, the received packets to determine a transmission time for each packet based on at least one rate limit policy and storing an identifier associated with the respective packet in a time-indexed data structure at a position in the time-indexed data structure associated with the transmission time determined for the packet. The method further includes, determining, by the scheduling module, that a time indexed in the time-indexed data structure has been reached, and in response, transmitting over a network interface driver, a packet associated with an identifier stored in the time-indexed data structure at a position associated with the reached time. The method further includes, communicating, subsequent to the network interface driver transmitting the packet, a transmission completion notification back to the application.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Figure 1:
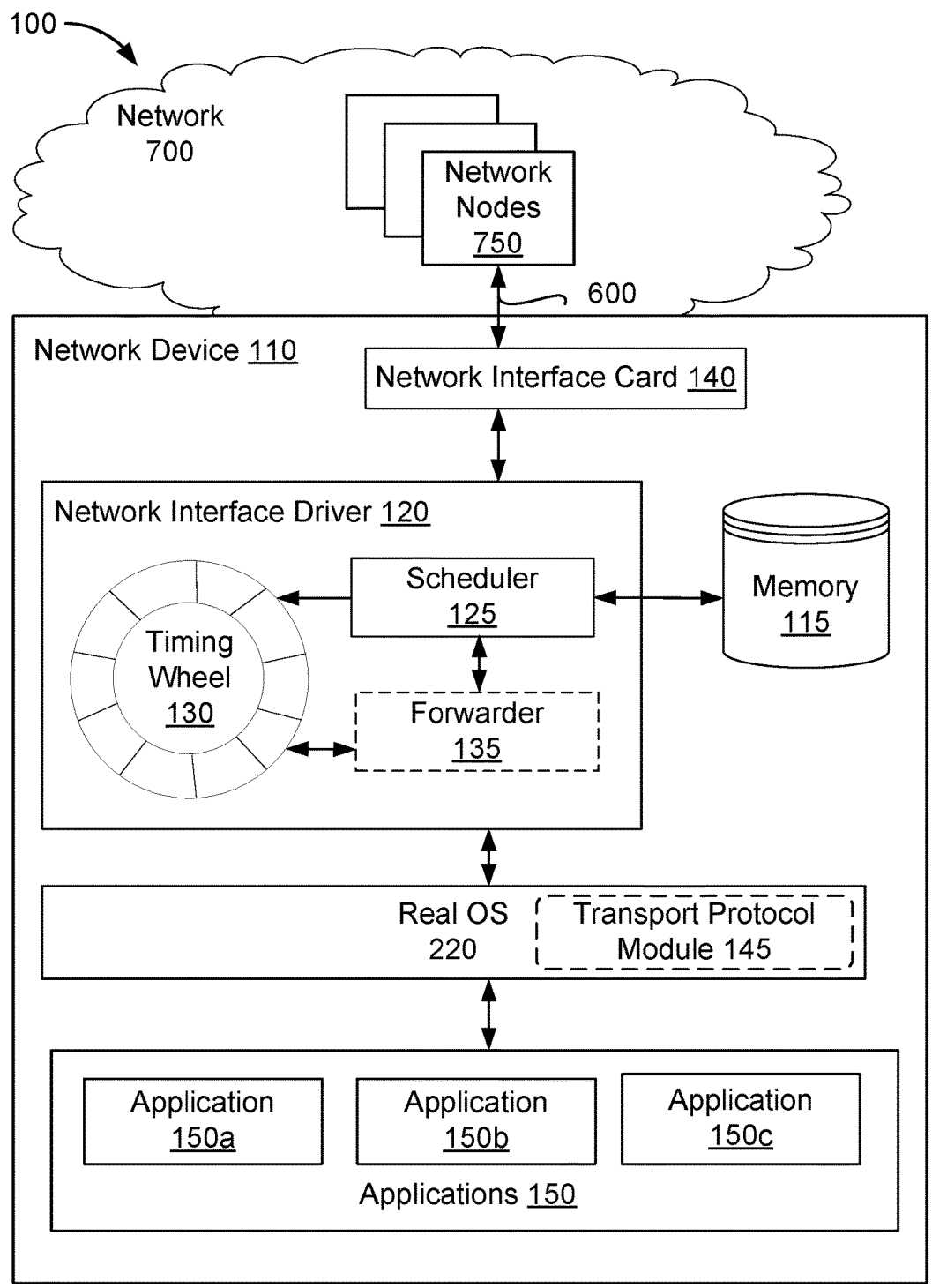
FIG. 1 is a block diagram of a network environment with a network device according to some implementations.

Traffic shaping systems should be designed for efficient memory usage and host processor power consumption while managing higher level congestion control, such as that in the transmission control protocol (TCP). For example, traffic shaping systems that delay, pace or rate limit packets to avoid bursts or unnecessary transmission delays may achieve higher utilization of network resources and host processing resources. A packet delay mechanism can reduce the need for large memory buffers. For example, when a packet is delayed, a feedback mechanism can exert "back pressure," i.e., send feedback, to a sending module (e.g., device or software component such as a software application) so as cause a sending module to reduce the rate at which it sends packets. Without packet delay mechanisms, an application will continue to generate packets and the packets may be buffered or dropped thereby costing additional memory and host processor power to queue or regenerate the packets.

Presented are devices and methods related to scalable traffic shaping using a time-indexed data structure and delayed completion mechanism. In some implementations, a network interface driver of the network device is configured to receive packets at the TCP layer of a network host from a plurality of applications. The received packets originate from applications executing on a computing device, for example, on one or more virtual machines or containerized execution environments hosted by the computing device. The network interface driver may prevent the applications from sending additional packets for transmission until the application receives a message confirming the previously forwarded packets have successfully been transmitted. For example, the network interface driver communicates a packet transmission completion message to a software application or a guest operating system that has awaited receipt of a packet transmission completion message before forwarding additional data packets to the network interface driver. As described herein, in some implementations, the network interface driver processes the received packets to determine a transmission time for each packet based on at least one rate limit policy. For example, a rate limit policy may include a rate pacing policy or a target rate limit. Additionally or alternatively, the rate limit policy may include a specific policy associated with a particular class of packets or an aggregate rate for a particular class of packets. In some implementations, based on processing the received packets, the network interface driver stores identifiers associated with the respective packets in a time-indexed data structure at a position associated with the transmission times determined for the respective packets. The time-indexed data structure may include a single time-based queue, such as a timing-wheel or calendar queue data structure to receive identifiers associated with packets from multiple queues or TCP sockets. Packet identifiers may be inserted and extracted based on the determined transmission time. In some implementations, the network interface driver or the network interface card may determine that a time indexed in the single time-indexed queue has been reached, and in response, transmit a packet associated with the identifier stored in the time-indexed data structure at a position associated with the reached time. For example, the network interface driver or network interface card may determine that time $t_0$ has been reached and, as a result, the network interface driver and/or network interface card causes a packet associated with an identifier specifying a $t_0$ transmission time to be transmitted by the network interface card of the network device. In some implementations, subsequent to the network interface card transmitting the packet, the network interface driver may communicate a transmission completion notification back to the application that originated the transmitted packet.

Single queue shaping can provide greater CPU efficiency compared to multi-queue systems by reducing host processing power consumption during packet processing and transmission. Single queue shaping systems also can enable more accurate rate limiting and schedulability of packets based on the packets' transmission policy. For example, utilizing a single time-based queue or calendar queue, packet timestamps that are created by the packet generating application can be leveraged to schedule an optimal packet transmission time based on a combination of rate limit, pacing rate, and/or bandwidth sharing policy associated with the packet.

The network devices and methods discussed herein can achieve scalable traffic shaping per packet by timestamping each packet based on a rate policy or scheduling policy. In some implementations, the packets are timestamped, at least initially, by the application originating the packets. By timestamping packets at the source, i.e., by the application that is generating the packet, the need to pre-filter packets can be mitigated. Devices and methods that require pre-filtering can introduce expensive processing requirements or specific hardware configurations, such as requiring multiple queues to timestamp packets according to one or more rate limiting policies. Accordingly, implementations that incorporate source timestamping can reduce the processing time and resources used by those devices and methods.

The network device and method can further achieve scalable traffic shaping per packet by enqueueing packet identifiers associated with the packet in a single, time-indexed data structure according to the timestamp. Implementations utilizing this method and a single, time-indexed data structure may support tens of thousands of packet flows with minimal processing overhead when implemented with particular transmission rules. For example, an efficient single, time-indexed data structure may be configured to avoid queueing packets with a timestamp that is older or in the past compared to the current time, e.g., "now", as these packets should be transmitted immediately. Additionally, or alternatively, an efficient single, time-indexed data structure may be configured to include a maximum time horizon, beyond which no packets should be scheduled. Alternate implementations of an efficient single, time-indexed data structure that are configured with a maximum time horizon may further include rate limit policies that specify a minimum supported rate (e.g., a maximum supported time between packets) or a maximally supported load in terms of numbers of packets transmitted. Additionally, or alternatively, implementations of an efficient single, time-indexed data structure may include limiting the frequency with which the networking stack may interact with the time-index data structure and thereby defining the granularity of the time-indexed data structure.

In some implementations, the network device and method further achieve scalable traffic shaping per packet by dequeuing the packet as quickly as possible when the deadline for transmission, as identified in the timestamp, has passed and delivering a completion message to the packet source enabling new packets to be transmitted. In conventional systems, packets are processed in order from a transmission queue, e.g., a first-in-first-out (FIFO) queue, and completions are returned in order. In some implementations of the present disclosure, the network device and method may cause completion messages to be returned out of order by removing some data packets from the transmission queue for delayed transmission (without dropping the packets). With this configuration of "out of order completion," because an application will not send more data packets until a completion message is received for data packets already forwarded to the network interface driver, an application can be forced to reduce its transmission rate. This configuration can avoid head of line blocking by preventing a data packet to be delayed by remaining in the queue. Moreover, in some implementations, this "out of order" completion configuration can apply to individual flows (or streams or classes) of data packets within an application, e.g., an application having large numbers of connections open for corresponding flows or streams, so that each flow can be selectively slowed down or sped up.

Furthermore, in some implementations, the "out of order" completion configuration can exert "back pressure" to a sending module or application without head of line blocking, irrespective of how many primary transmission queues there are or how packets are put in each queue, as long as completion messages can be returned out of order. In some implementations, a traffic shaping mechanism with the "out of order" completion configuration can be implemented with specific network/hardware configurations (e.g., a specific number of primary transmission queues and specific queue assignment rules). For example, to shape a thousand flows/streams of traffic, a traffic shaping mechanism can be implemented with only a single queue or with a small number of queues (e.g., 16-32 queues). When implemented in a system having a small number of queues, a traffic shaping mechanism can return "out of order" completion messages whether each packet is put in a right queue based on predetermined queue assignment rules or packet traffic is "randomly" spread over the queues. For example, an "out of order" completion traffic shaping system for shaping packet traffic spread from a Linux system over a number of hardware queues can be implemented in a virtual machine without modification of network/hardware configurations (e.g., queue assignment rules of the Linux system or number of hardware queues). In some implementations, the traffic shaping system can provide such network/hardware compatibility by hiding the traffic shaping layer, flow classification rules and policies from an application or user.

The network device and associated network interface driver configuration may be implemented to have a single scheduler and a single time-indexed data structure or to have multiple schedulers and multiple time-indexed data structures employing the same or different traffic shaping policies.

In the above-described implementations, packet sources, such as software applications running on a real OS of the network device (as opposed to on a guest OS of a virtual machine), or software applications or an upper layer of a TCP stack in a guest OS managed by a hypervisor, need not to be aware of the traffic shaping policies or algorithms implemented in a network interface driver or on a network interface card. Therefore, costs in implementing network interface drivers and guest operating systems in virtual machine environments can be reduced. Moreover, packet sources also need not be aware of other configuration parameters, e.g., packet classification rules and other rate limiting policies. Therefore, traffic shaping can be performed in a more reliable manner than a method in which an application or user configures such detailed algorithms and policies.

FIG. 1 is a block diagram of an example network environment 100 with a network device 110. In broad overview, the illustrated network environment 100 includes a network 700 of interconnected network nodes 750. The network nodes 750 participate in the network 700 as data sources, data destinations (or data sinks), and intermediary nodes propagating data from sources towards destinations through the network 700. The network 700 includes the network device 110 with links 600 to various other participating network nodes 750. Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network. The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 700. It can be public, private, or a combination of public and private networks. In general, the network 700 is used to convey information between computing devices, e.g., network nodes 750, and the network device 110 of the data traffic shaping system facilitates this communication according to its configuration.

As shown in FIG. 1, the network device 110 is a server hosting one or more applications 150a-150c (generally applications 150) executing on a real operating system (OS).

Figure 10:
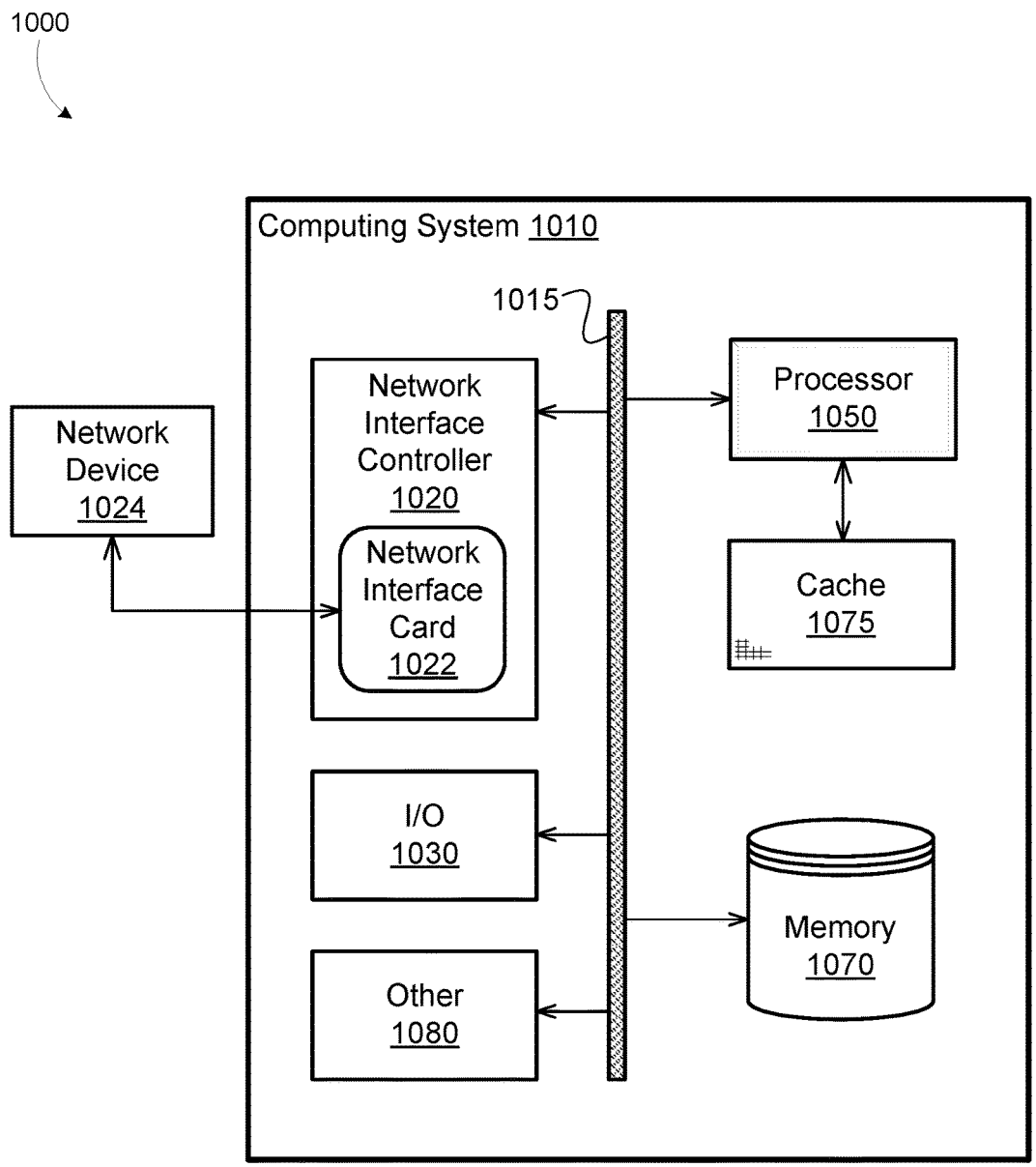
FIG. 10 is a block diagram of an example computing system.

As discussed further below, in other implementations, the network device can be a server hosting virtual machines or containers that are executing applications 150. The network device 110 includes a network interface driver 120, a memory 115, a network interface card 140, a real OS 220 and applications 150. The network interface driver 120 can include a scheduler 125, a timing wheel data structure 130, and in some implementations a forwarder 135 (shown in dashed lines). In some implementations, the network device 110 has configuration similar to that of a computing system 1010 as shown in FIG. 10. For example, the memory 115 can have configuration similar to that of a memory 1070 as shown in FIG. 10, and the network interface card 140 can have configuration similar to that of a network interface card 1022 or a network interface controller 1020 as shown in FIG. 10. The computing system 1010 is described in more detail below, in reference to FIG. 10. The elements shown in the computing system 1010 illustrated in FIG. 10 do not all need to be present in some implementations of the network device 110 illustrated in FIG. 1.

Referring again to FIG. 1, in some implementations, the network device 110 hosts one or more applications 150 (for example applications 150a, 150b and 150c). One or more of the applications 150a-150c can be software applications running on a real operating system of the network device 110. As discussed in further in relation to FIGS. 2A and 2B, in some implementations, one or more of the software applications 150a-150c can be a software application running on a guest OS managed by a hypervisor in a virtual machine environment, or an upper layer of a protocol stack (e.g., the TCP stack) of a guest OS of the virtual machine environment. For example, referring to FIG. 2A, the applications 150a-150c can each be a software application 230 running on a real OS 220, a software application 265 running on a guest OS 260 of Virtual Machine 1, managed by a hypervisor 250, or an upper layer of a protocol stack 261 of the guest OS 260 of Virtual Machine 1 in FIG. 2A. The hypervisor 250 and a virtual machine environment related thereto are described in more detail below in reference to FIG. 2A.

Referring back to FIG. 1, in some implementations, the network device 110 includes a memory 115. In some implementations, the memory 115 stores packets received from applications 150 via real OS 220 for transmission by the network interface card 140. In some implementations, the memory 115 may store computer executable instructions of a transport protocol module 145 (such as a TCP protocol module or the TCP layer of the network stack) to be executed on a processor. In some other implementations, the memory 115 may store computer executable instructions of a network interface driver 120. Additionally, or alternatively, the memory 115 may store rate limiting algorithms, rate limiting policies, or computer executable instructions utilized by the scheduler 125. In some implementations, the memory 115 may store statistics or metrics associated with a flow or classes of packets that have already been transmitted by the network device 110 and/or that have been scheduled for future transmission. For example, the memory 115 may store statistics or metrics such as prior and upcoming transmission times and historic transmission rates of packets in each class of packets for which rate limits are to be applied. The statistical data may also include the number of packets currently in the timing wheel 130 (discussed further below) associated with each class. The memory 115 may store data and/or instructions related to the operation and use of the network interface driver 120. The memory 115 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In some implementations, the memory 115 stores computer executable instructions, which when executed by the network interface driver 120, cause the network interface driver 120 to carry out at least the process stages 330, 340 and 350 shown in FIG. 3, which are described further below.

The network interface driver 120 can include a network interface driver software module running on a real OS. A network interface driver, such as the network interface driver 120, can be a collection of computer executable instructions stored in the memory 115 that when executed by a processor cause the functionality discussed below to be implemented. In some other implementations, the network interface driver 120 may be implemented as logic implemented in a hardware processor or other integrated circuit, or as a combination of hardware and software logic. The network interface driver 120 can communicate with one of the software applications 150a-150c (e.g., the application 265 in FIG. 2A) directly (if operating on the real OS 220 of the network device 110), via a guest OS of a virtual machine (or in some implementations, through a hypervisor and the guest OS) (if operating in a virtual machine environment), or via a container manager of a containerized environment. In some implementations, the network interface driver 120 is included within a first layer of a transmission control protocol (TCP) stack of the real OS of the network device 110 and communicates with a software module or application that is included in an upper layer of the TCP stack. In one example, the network interface driver 120 is included within a transport layer of a TCP stack and communicates with a software module or application that is included in an application layer of the TCP stack. In another example, the network interface driver 120 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 120 can be included as a portion of the network interface card 140.

As mentioned above, the network interface driver 120 includes a scheduler 125. A scheduler, such as the scheduler 125, can be a collection of computer executable instructions, stored for example in the memory 115, that when executed by a processor cause the functionality discussed below to be implemented. In some other implementations, the scheduler 125 may be implemented as logic implemented in a hardware processor or other integrated circuit, or as a combination of hardware and software logic. In some implementations, the scheduler 125 is utilized to manage the sequence of packet identifiers inserted into and extracted from the timing wheel data structure 130. Additionally, or alternatively, the scheduler 125 may implement known, existing network scheduling algorithms available for different operating system kernels. In some implementations, the scheduler 125 may implement custom, user-defined scheduling algorithms. For example, the scheduler 125 may include rate limiting policy algorithms capable of calculating timestamps for received packets. In some implementations, the scheduler 125 may implement a weighted fair queuing algorithm to ensure multiple packet flows share bandwidth proportionally to their weights in a min-max fairness allocation scheme. Additionally, or alternatively, the scheduler 125 may consolidate timestamps such that larger timestamps represent smaller target transmission rates. In some implementations, the scheduler 125 may store and/or retrieve rate limiting scheduling algorithms from the memory 115. Additionally, or alternatively, scheduler 125 may evaluate packets received by the network interface driver 120 and store packet identifiers in the timing wheel data structure 130. In some implementations, the scheduler 125 may evaluate received packet data to determine a transmission timestamp associated with the received packet. Additionally, or alternatively, the scheduler 125 may determine an updated transmission timestamp for a packet received already having a timestamp applied by the application, virtual machine, or container originating the packet, and may apply the updated transmission timestamp to the packet identifier. In some implementations, the scheduler 125 may instruct the timing wheel data structure 130 to store a packet identifier with a transmission timestamp at the appropriate timeslot in the timing wheel data structure 130. Additionally or alternatively, the scheduler 125 may instruct the timing wheel 130 to extract a stored packet identifier, for example, a packet identifier including a transmission timestamp, when the transmission time has been reached. The scheduler 125 is described in more detail below in reference to FIGS. 4A-4C.

As mentioned above and as shown in FIG. 1, the network interface driver 120 includes a timing wheel data structure 130 (also defined as timing wheel 130). A timing wheel data structure is a time indexed queue, which can be implemented as a circular buffer, that is used to queue objects at given times in $O(1)$ and fetch objects to be processed at a specific time in $O(1)$. The time complexity of an algorithm may be estimated as a function of the number of elementary operations performed by the algorithm. This estimate may be represented in the form $O(n)$. For example, an algorithm may be of constant time (e.g. $O(n)$, where n=1) if the value of the running time, $T(n)$, is bounded by a value that does not depend on the size of the input. As described above, accessing a single element (e.g. a packet identifier) in a timing wheel data structure takes constant time (e.g., $O(1)$) as only one operation has to be performed to locate the element. In some implementations, the timing wheel data structure 130 may store packet identifiers provided by the scheduler 125 in a timeslot associated with the timestamp specified by the application 150 that generated the packet or according to the updated transmission timestamp determined by the scheduler 125. The timing wheel data structure 130 is described in more detail below in reference to FIGS. 4A-4C. In some other implementations, instead of a timing wheel, a different time-indexed data structure, such as a calendar queue is used to schedule transmission of packets.

As further shown in FIG. 1, the network interface driver 140 may also include a forwarder 135 (as shown in dashed lines). A forwarder, such as the forwarder 135, can be a collection of computer executable instructions, stored for example in the memory 115, that when executed by a processor cause the functionality discussed below to be implemented. In some implementations, the forwarder 135 may be implemented as logic implemented in a hardware processor or other integrated circuit, or as a combination of hardware and software logic. The forwarder 135 is configured to query the timing wheel 130 to determine if a time indexed in the timing wheel 130 has been reached and to extract appropriate packet identifiers from the timing wheel 130 based on determining that their transmission time indexed in the timing wheel 130 has been reached. The forwarder 135 may execute instructions to forward the packet to the network interface card 140 for transmission. In some implementations, the forwarder 135 may be included in the network interface driver 120. In some implementations, as described further below, the forwarder 135, or the functionality of the forwarder 135, may be incorporated into the scheduler 125.

The network interface card 140 includes hardware configured to send and receive communications to and from the network nodes 750. In some implementations, the network interface card 140 may be capable of supporting high speed data receipt and transmission as required, for example, in optical fiber channels where data frame rates may approach 100 gigabits per second. In some implementations, network interface card 140 may be configured to support lower speed communications, for example, over copper (or other metal) wire, a wireless channel, or other communications medium.

The functionality described above as occurring within the TCP layer of a network device can be additionally or alternatively executed in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module. As used herein, a network layer, a transport layer, or a combined transport/network layer will generally be referred to as a packet layer of the network protocol stack.

Figure 2A:
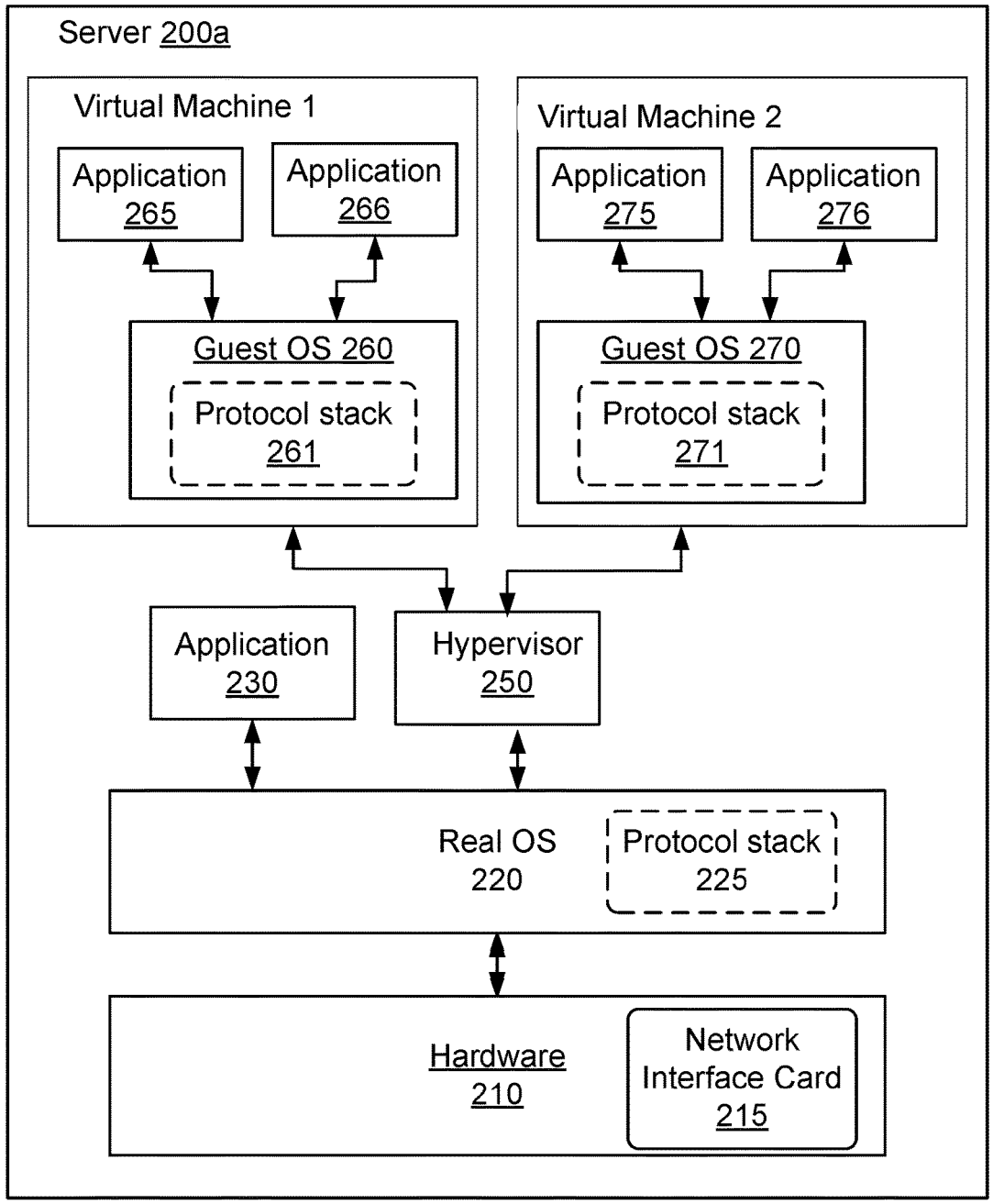
FIG. 2A is a block diagram of an example virtual machine environment.

FIG. 2A shows a block diagram of an example server 200a implementing a virtual machine environment. In some implementations, the server 200a includes hardware 210, a real operating system (OS) 220 running on the hardware 210, a hypervisor 250, and two virtual machines having guest operating systems (guest OSs) 260 and 270. The hardware 210 can include, among other components, a network interface card (NIC) 215. The hardware 210 can have a configuration similar to that of the computing system 1010 shown in FIG. 10. The NIC 215 of the hardware 210 can have configuration similar to that of the network interface controller 1020 or the network interface card 1022 as shown in FIG. 10. In some implementations, the real OS 220 has a protocol stack 225 (e.g., TCP stack) or a transport protocol module 145 as shown in FIG. 1. In some implementations, the real OS 220 includes a software application running on the real OS 220. In some implementations, the guest OSs 260 and 270 include protocol stacks 261 and 271, respectively. Each of the guest OSs 260 and 270 can host a variety of applications, e.g., software applications 265, 266, 275 and 276. The server 200a may be a file server, application server, web server, proxy server, appliance, network appliance, gateway, gateway server, virtualization server, deployment server, SSL VPN server, or firewall.

Referring again to FIG. 2A, the server 200a executes the hypervisor 250, which instantiates and manages the first guest OS 260 and the second guest OS 270 on Virtual Machine 1 and Virtual Machine 2, respectively. The first guest OS 260, configured on Virtual Machine 1, hosts a first software application 265 and a second software application 266. The second guest OS 260, configured on Virtual Machine 2, hosts a third software application 275 and a fourth software application 276. For example, the applications can include database servers, data warehousing programs, stock market transaction software, online banking applications, content publishing and management systems, hosted video games, hosted desktops, e-mail servers, travel reservation systems, customer relationship management applications, inventory control management databases, and enterprise resource management systems. In some implementations, the guest OSs host other kinds of applications. The interactions between the components of the server 200a are described further in relation to FIG. 3, below.

Figure 2B:
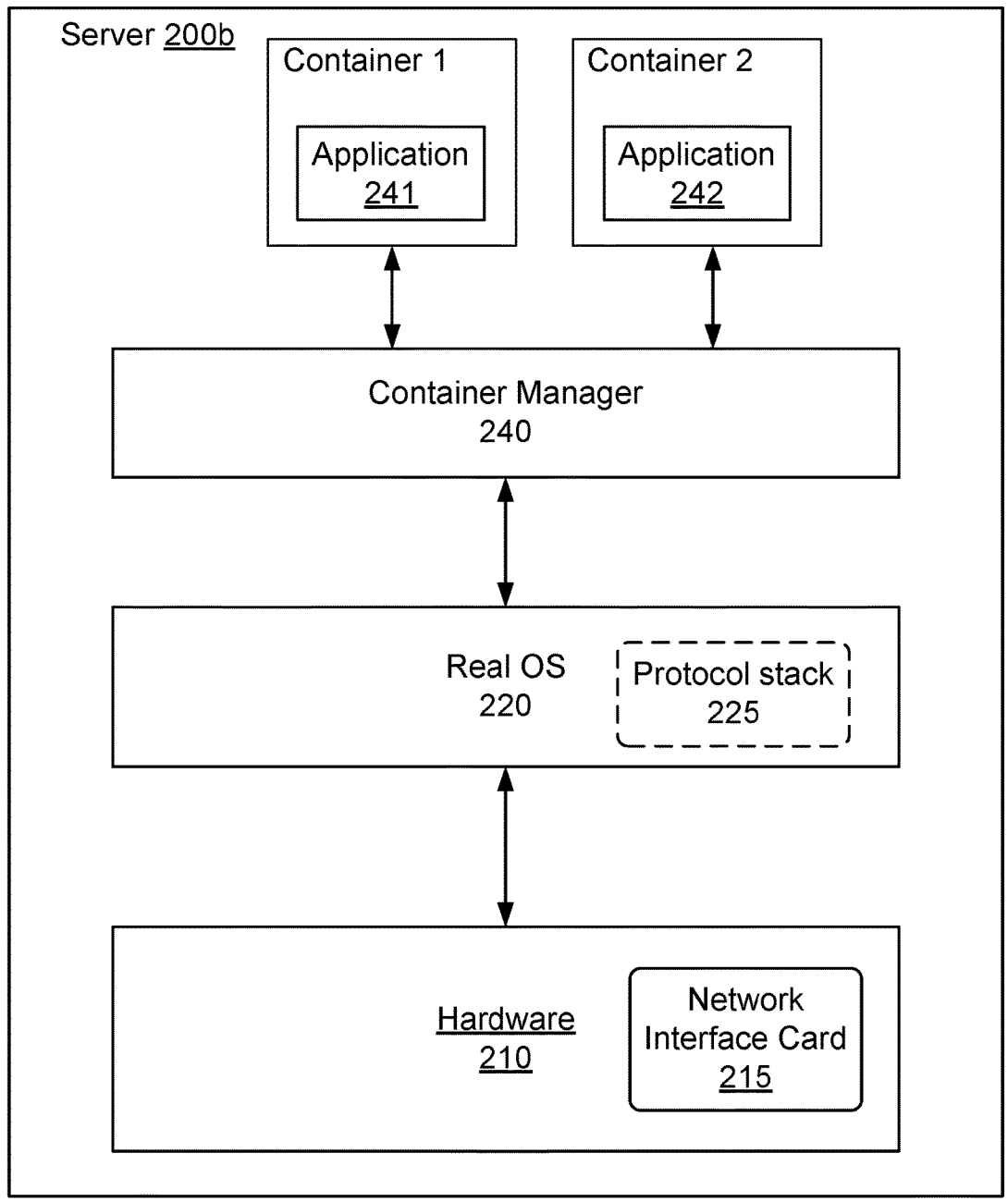
FIG. 2B is a block diagram of an example containerized environment.

FIG. 2B shows a block diagram of an example server 200b implementing a containerized environment. In some implementations, the server 200b includes hardware 210, a real operating system (OS) 220 running on the hardware 210, a container manager 240, two containerized environments (e.g., Container 1 and Container 2) executing applications 241 and 242, respectively. The hardware 210 can include, among other components, a network interface card (NIC) 215. The hardware 210 can have configuration similar to that of the computing system 1010 as shown in FIG. 10. The NIC 215 of the hardware 210 can have configuration similar to that of the network interface controller 1020 or the network interface card 1022 as shown in FIG. 10. In some implementations, the real OS 220 has a protocol stack 225 (e.g., TCP stack) and has a software application running on the real OS 220. Each of the containers, (e.g., container 1 and container 2 can host a variety of applications, e.g., software applications 241 and 242. The server 200b may be a file server, application server, web server, proxy server, appliance, network appliance, gateway, gateway server, virtualization server, deployment server, SSL VPN server, or firewall.

Referring again to FIG. 2B, the server 200b executes the container manager 240, which instantiates and manages container 1 and container 2, respectively. Container 1 hosts a software application 241. Container 2 hosts a software application 242. For example, the applications can include database servers, data warehousing programs, stock market transaction software, online banking applications, content publishing and management systems, hosted video games, hosted desktops, e-mail servers, travel reservation systems, customer relationship management applications, inventory control management databases, and enterprise resource management systems. In some implementations, the containers (e.g., container 1 or container 2) may host other kinds of applications. The interactions between the components of the server 200b are described further in relation to FIG. 3, below.

Figure 3:
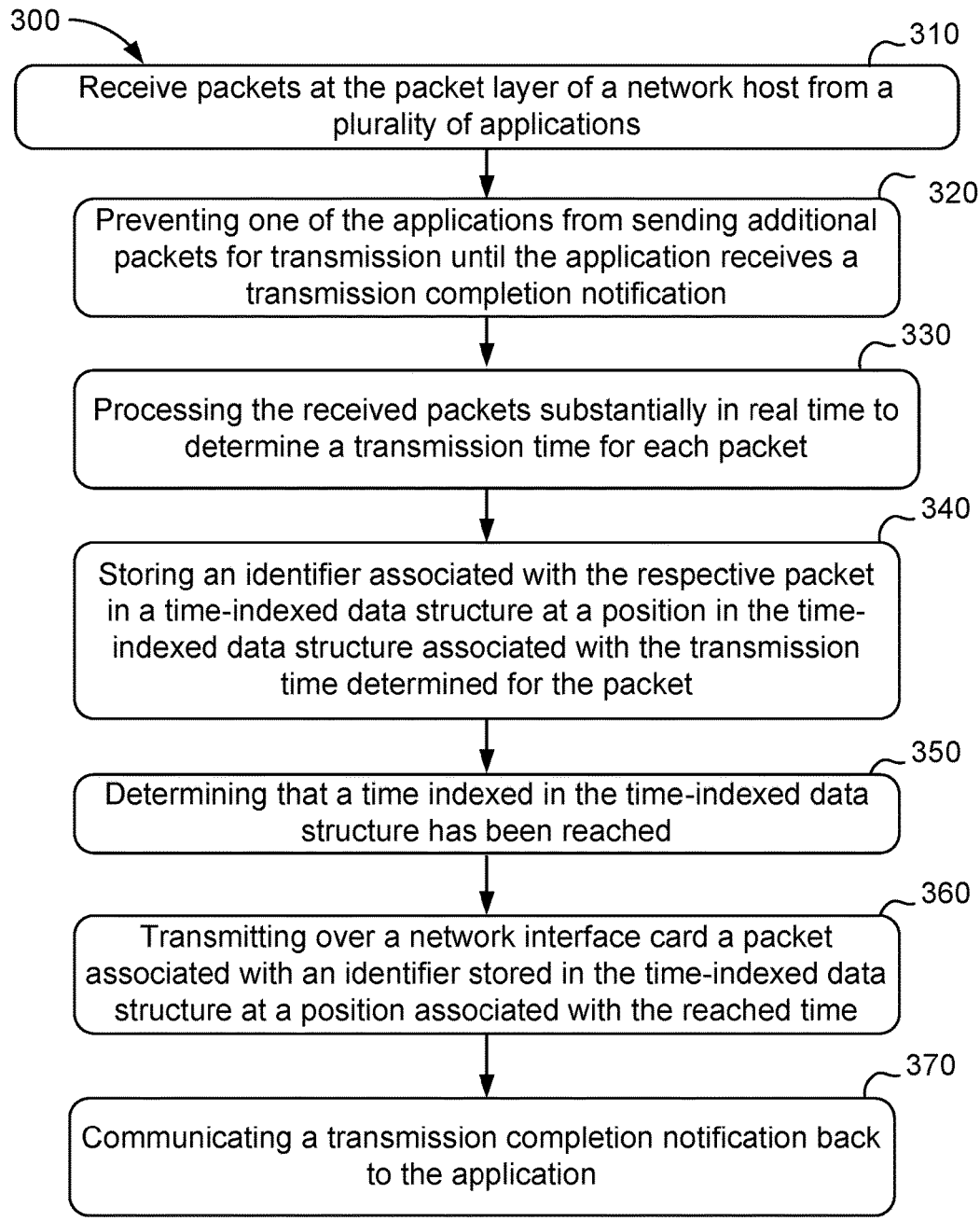
FIG. 3 is a flowchart showing operations of a network device according to some implementations.

FIG. 3 is a flowchart for shaping network traffic using an example method 300 performed by a network device, such as the network device 110 shown in FIG. 1. The method 300 includes receiving packets at the TCP layer of a network host from a plurality of applications (stage 310) and preventing one of the applications from sending additional packets for transmission until the application receives a transmission completion notification (stage 320). The method further includes processing the received packets to determine a transmission time for each packet (stage 330) and storing an identifier associated with each respective packet in a time-indexed data structure at a position in the time-indexed data structure associated with the transmission time determined for the packet (stage 340). The method 300 also includes determining that a time indexed in the time-indexed data structure has been reached (stage 350) and transmitting over a network interface driver a packet associated with an identifier stored in the time-indexed data structure at a position associated with the reached time (stage 360). The method further includes communicating a transmission completion notification back to the application (stage 370).

The method 300 includes receiving packets at the TCP layer of a network host from a plurality of applications (stage 310). In some implementations, the plurality of applications generating packets may be applications hosted in a virtualized machine environment, such as any of applications 265, 266, 275 or 276 in FIG. 2A. Additionally, or alternatively, the received packets may be generated by an application executing on the real OS of a network host, such as application 230 in FIG. 2A. In some implementations, the applications may be included in a containerized environment, such as applications 241 or 242, as shown in FIG. 2B. Additionally, or alternatively, the TCP layer receiving the packets may be a upper layer protocol stack of a guest OS in a virtualized machine environment.

The method 300 also includes preventing one of the applications from sending additional packets for transmission until the application receives a transmission completion notification (stage 320). In some implementations, traffic shaping may be achieved in part by rate limiting the forwarding of additional data packets by an application to the TCP layer until a message is received indicating that a packet transmission has been completed. For example, a network interface card 140 (as shown in FIG. 1 and later described in more detail in FIGS. 6A-6B), may generate a completion notification back to an application 150 indicating that a packet has been transmitted over the network. This transmission completion notification provides a feedback mechanism to the application and limits the forwarding of additional packets by the application 150 to the TCP layer. This mechanism can be leveraged in conjunction with existing TCP functionality, such as TCP small queues that function to effectively limit the number of bytes that can be outstanding between the sender and receiver.

As further shown in FIG. 3, the received packets are processed to determine a transmission time for each packet (stage 330). In some implementations, the scheduler 125 may process the received data packets to determine a transmission time for each packet based on a rate limiting algorithm or policy stored in memory 115. For example, the scheduler 125 may process a packet and apply a transmission timestamp in accordance with a rate limiting algorithm or policy associated with the particular class of packets. In some implementations, the scheduler 125 is configured to determine a transmission time for each packet based on a rate pacing policy or target rate limit. For example, the scheduler 125 may determine a transmission time for each packet based on a rate pacing policy such as a packet class rate policy and/or an aggregate rate policy. In some implementations, the scheduler 125 may determine transmission times based on a rate pacing policy such as a weighted fair queuing policy to process multiple packet flows. Additionally, or alternatively, each packet may have a transmission timestamp requested by the application generating the packet. In some implementations, the scheduler 125 may receive packets including a requested transmission time assigned to the packet by one of the plurality of applications before being received at the TCP layer and before being processed by scheduler 125. The scheduler 125 may process the packet in substantially real time to determine an updated transmission time based on at least one rate limiting policy being exceeded and invoking a rate limit algorithm associated with the packet. For example, if a received packet is processed and the scheduler 125 determines that the transmission time for the packet will exceed the rate limit for packet class, the scheduler 125 may update the transmission time with an adjusted transmission timestamp that enables the packet to be transmitted at a later time, to avoid exceeding the rate limit defined by the rate limit policy for the particular packet class. The scheduler 125 may be configured to find the associated rate limit algorithm via a hash table or mapping identifying a rate limit algorithm associated with the received packet.

The method 300 further includes the network device 110 storing an identifier associated with the respective packet in a time-indexed data structure at a position in the time-indexed data structure associated with the transmission time determined for the packet (stage 340). A time-indexed data structure, such as the time-indexed data structure 130, may be configured to include multiple positions or time-slots to store data or events. The time-indexed data structure includes a time horizon which is the maximum period of time into the future that the data or events may be stored. For example, a time-indexed data structure may be configured to include 50 time-slots, where each time-slot represents the minimum time granularity between two events. If the time-indexed data structure including 50 slots was configured such that each time-slot represented a granularity of 2 microseconds, the time horizon would be 100 microseconds. In this example, no data or events would be scheduled beyond 100 microseconds into the future. A suitable time horizon and timing wheel granularity (e.g., the number of time-slots), may be configured based on the rate-limit policy to be enforced. For example, to enforce a rate of 1 megabit (Mb) per second, a suitable time horizon would be 12 milliseconds. A suitable number of time-slots or positions for the timing wheel 130 may be in the range of 10-1,000,000 time-slots or positions. A suitable time horizon for the timing wheel 130 may be in the range of microseconds to seconds. In some implementations, one or more timing wheels may be implemented hierarchically and each of the one or more timing wheels may be configured to have a different number of time-slots and a different timing wheel granularity. In this example, each of the one or more hierarchical timing wheels may have a different time horizon. In some implementations, a packet identifier may correspond to the timestamp requested by the application generating the packet or the adjusted transmission timestamp determined by the scheduler 125. For example, a packet may include an identifier which may specify a requested transmission time which is 10 microseconds from the current time. The scheduler 125 may process the packet to determine whether, based on the rate limit policy associated with that particular class of packet, transmitting the packet immediately would exceed the rate limit. Assuming the rate limit is not exceeded, the scheduler 125 may insert the packet identifier into a time-indexed data structure 130 at a position associated with a transmission time 10 microseconds in the future. In some implementations, the time-indexed data structure may act as a first-in, first-out (FIFO) queue if all packets have a time stamp of zero (e.g., transmission time is now) or any value smaller than now. For example, a packet identifier with a time stamp of zero will be transmitted immediately. Additionally, or alternatively, all packet identifiers with timestamps older than now are inserted into the data structure position with the smallest time so they can be transmitted immediately. Any packet identifiers with a timestamp that is beyond the time horizon of the time-indexed data structure are inserted into the last position in the data structure (e.g., the position that represents the maximum time horizon).

The method 300 also includes determining that a time indexed in the time-indexed data structure has been reached (stage 350). In some implementations, the network interface driver 120 may determine that a specific transmission time associated with a packet identifier stored in the time-indexed data structure 130 has been reached. The network interface driver 120 may query the time-indexed data structure 130 with the current time to determine whether there are any packets that are to be transmitted. For example, the network interface driver 120 may query the data structure using the current CPU clock time (or some other reference time value such as regularly incremented integer value). Frequent polling may provide a greater conformance with packet schedules and rate limit policies as well as reducing overhead compared to using separate timers which can cause significant CPU overhead due to interrupts. In some implementations, the time-indexed data structure 130 may be implemented on a dedicated CPU core. Additionally, or alternatively, the time-indexed data structure 130 may be implemented on an interrupt-based system which may perform polling of the data structure at a constant interval to determine packet transmission schedules. For example, the time indexed data structure 130 can be polled periodically with a period equal to the length of time associated with each time slot or a multiple thereof. In some implementations, the polling of the timing wheel can be carried out by logic distinct from the scheduler 125, such as the forwarder 135 shown in FIG. 1.

As further shown in FIG. 3, the network device 110 transmits, over a network interface card 140, a packet associated with an identifier stored in the time-indexed data structure at a position associated with the reached time (stage 360). In some implementations, the network interface driver 120 may transmit a packet stored in memory 115 to network interface card 140 based on reaching (or passing) the transmission time identified in the packet identifier that was stored in the time-indexed data structure 130. For example, network interface driver 120 may poll the time-indexed data structure 130 and may determine that the transmission time identified in a packet identifier has been reached. In response, the network interface driver 120 may instruct the network device to dequeue the packet from memory 115 and may transmit the packet via the network interface card 140. In some implementations, the network interface driver 120 may identify a transmission time older than now and in response, transmit the packet immediately.

The method 300 includes communicating a transmission completion notification back to the application (stage 370). The network interface driver 120 may communicate a completion notification back to an application 150 originating a packet following successful transmission of the packet by network interface card 140. The completion notification allows the application 150 to send additional packets to the network interface driver 120. The transmission completion notification mechanism is described in more detail below in reference to FIGS. 6A-6B.

The functionality described above as occurring within the TCP layer of a network device can be additionally or alternatively executed in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module.

Figure 4A:
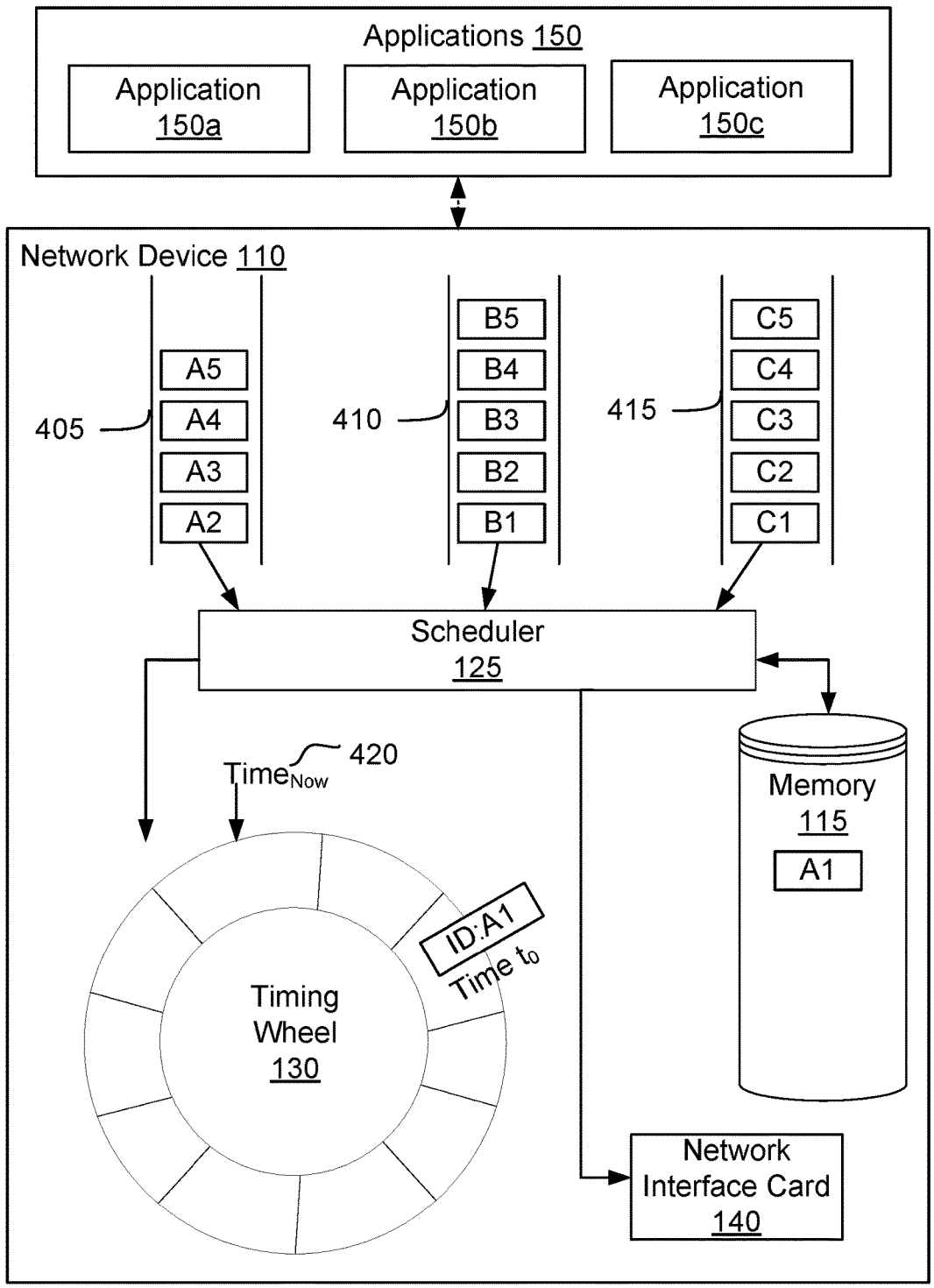
FIG. 4A-4C are block diagrams showing operations of a network device according to some implementations.
Figure 4B:
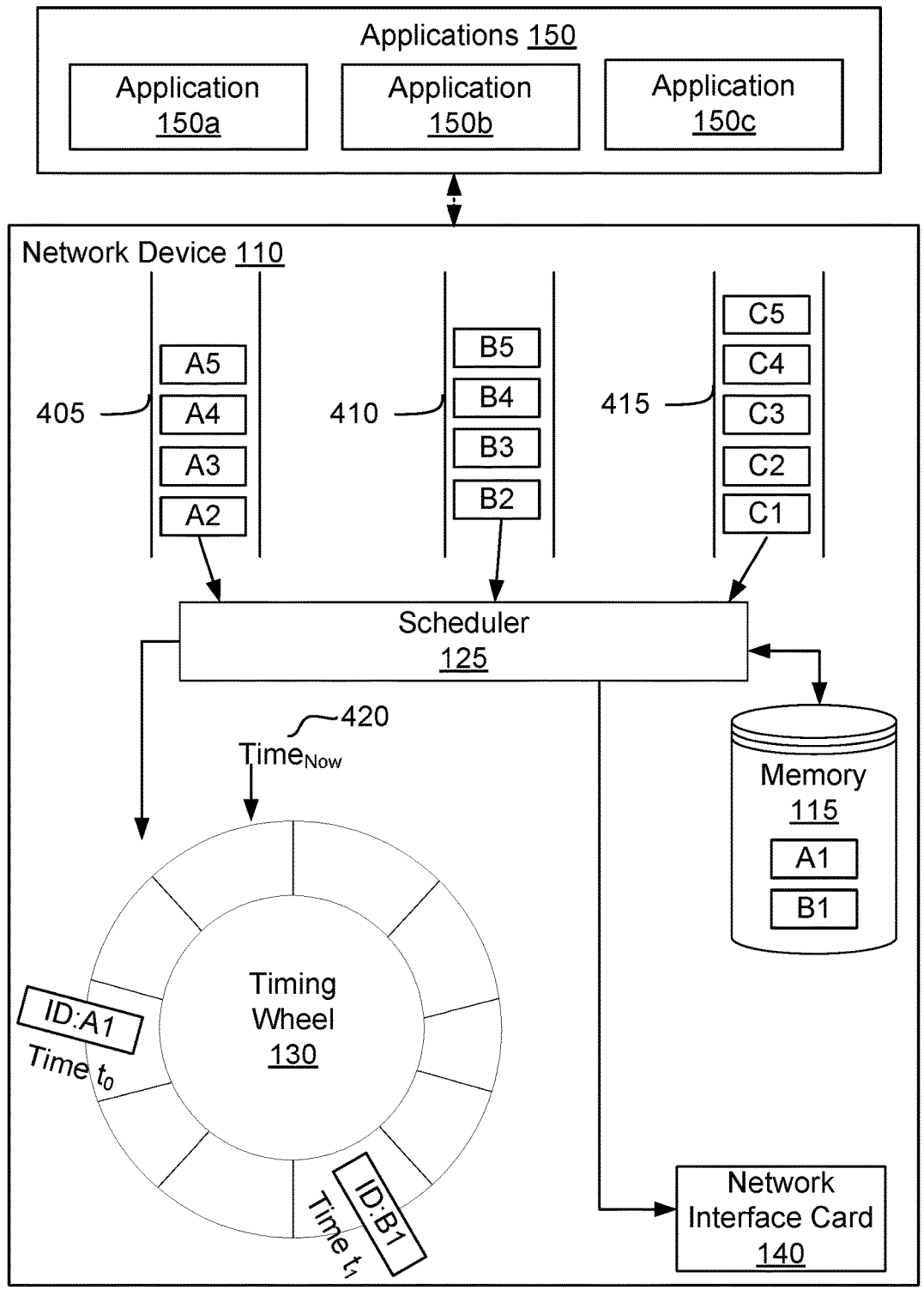
Figure 4C:
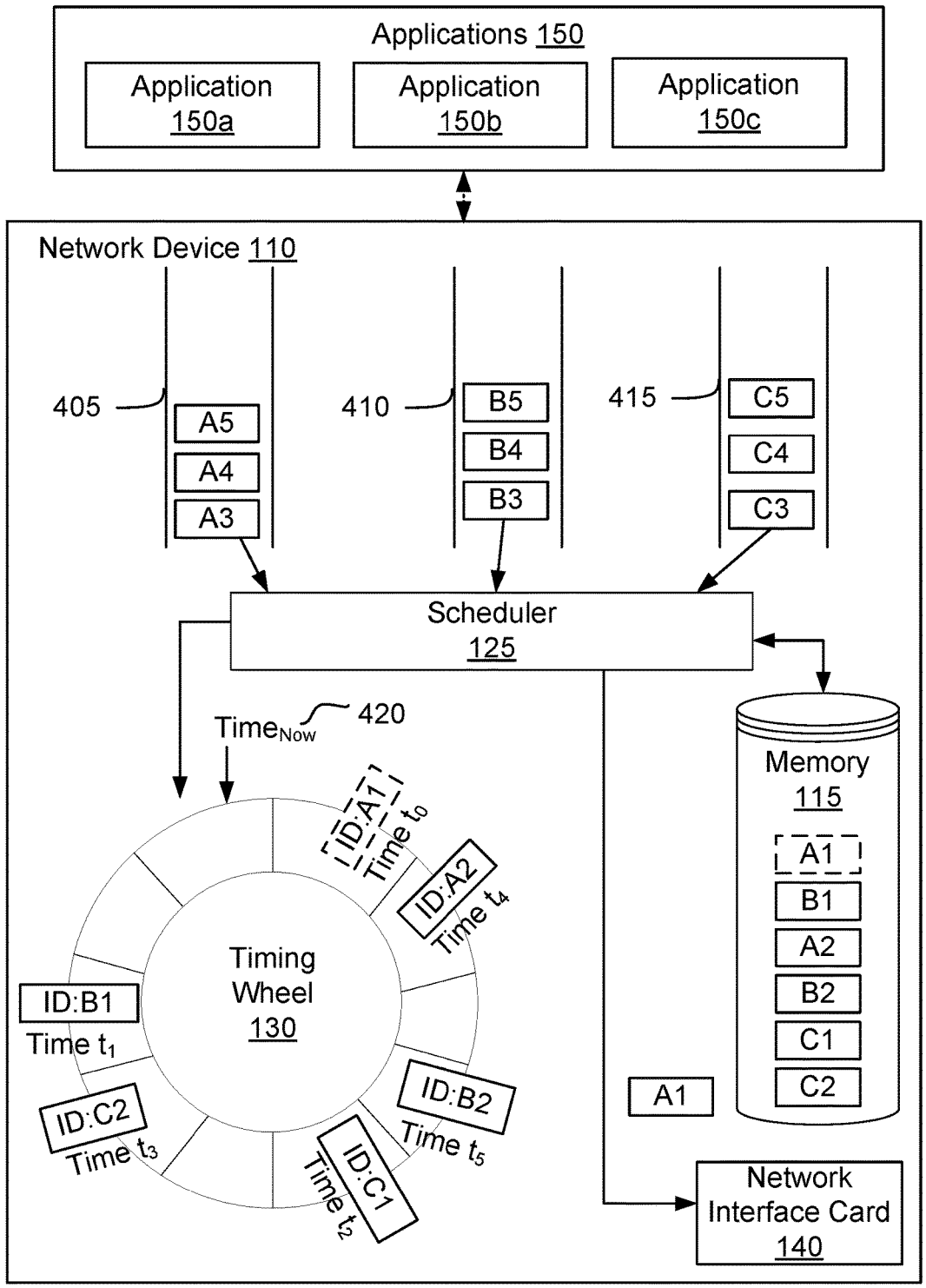

FIG. 4A-4C are block diagrams representing example operations for shaping network traffic using a scheduler and time-indexed data structure performed by a network device, such as the network device 110. In broad overview, and as shown in FIG. 4A, the network device 110 receives data packets from applications 150 (e.g., applications 150a, 150b and 150c). Network device 110 includes one or more socket buffers 405, 410, and 415, to queue and process packets received from applications 150. The network device 110 further includes one or more memory devices 115 for storing instructions and data, a scheduler 125 to process packets in accordance with rate limiting algorithms or policies stored in memory 115. The network device 110 further includes a time-indexed data structure 130, also referred to as a timing wheel 130, to store packet identifiers according to their transmission time. The network device 110 also includes one or more network interface cards 140 to transmit packets.

Referring to FIG. 4A and FIG. 3, the network device 110 receives packets at its TCP layer from a plurality of applications 150 (e.g., applications 150a, 150b or 150c). The TCP layer of the network device 110, as shown in FIG. 4A, includes three socket buffers (405, 410 and 415), one for each application. For illustrative purposes, it is assumed that packets from application 150a are queued and processed in socket buffer 405, packets from application 150b are queued and processed in socket buffer 410, and packets from application 150c are queued and processed in socket buffer 415. In some implementations, the network device 110 may have one or more socket buffers that process packets from multiple applications. The network device 110 may be configured to receive packets from applications executing on a real operating system of the network device 110, from a virtual machine environment, a container execution environment, or a combination of real operating system, virtual machine and/or container execution environments.

As shown in FIG. 4A, packets from application 150a are received by the socket buffer 405 in sequential order of their transmission by application 150a. For example, packet A1 was the initial or first packet transmitted from application 150a and has begun processing by the scheduler 125. Packets A2, A3, A4, and A5 remain queued in socket buffer 405. Similarly, application 150b generates and transmits packets to socket buffer 410. For example, packets B1, B2, B3, B4, and B5 represent the sequential order (e.g., B1 being the first packet) of packets transmitted by application 150b and which remain queued in the socket buffer 410 to be processed by the scheduler 125. Similarly, packets C1, C2, C3, C4, and C5 represent the sequential order (e.g., C1 being the first packet) of packets transmitted by application 150c and which remain queued in the socket buffer 415 to be processed by the scheduler 125. In some implementations, and discussed in more detail in regard to FIGS. 6A-6B, applications 150 may be prevented from sending additional packets for transmission until the application receives a transmission completion notification (as shown in stage 320 of FIG. 3).

As further shown in FIG. 4A and stage 330 of FIG. 3, the scheduler 125 processes the queued packets to determine a transmission time for each packet. The scheduler 125 may sequentially process packets from one or more socket buffers in a sequential order, a random order, or some other predetermined order. The scheduler 125 may determine a transmission time for each received packet by identifying the rate limiting algorithm or policy associated with the packet and assigning an initial or updated transmission time to the packet. The scheduler 125 may retrieve a rate limiting algorithm or policy from memory 115 to determine the initial or updated transmission time for each received packet. Received packets may be identified by the scheduler 125 as belonging to a particular class of packets. Packets in a particular class may require a specific rate limiting algorithm or policy associated with the packet class. The scheduler 125 may utilize the specific rate limiting algorithm or policy to determine an initial or updated transmission time for each packet of the class. In some implementations, scheduler 125 may evaluate a packet transmission time requested by application 150 and determine if the requested transmission time exceeds the rate limiting algorithm or policy associated with the packet class (e.g., if transmission at the requested time would result in too high a transmission rate for the packet class given the transmission history of other recently transmitted packets or packets already scheduled for future transmission in that class). The scheduler 125 may process scheduler 125 may process the packets and determine that a transmission time requested by the application 150 violates the rate limit or policy associated with the packet class. If the rate limit or policy is exceeded or otherwise violated, the scheduler 125 may determine an updated transmission time that does not exceed or violate the rate limit or policy for each packet. The scheduler 125 may determine that a requested or updated transmission time is the present time and may execute instructions to immediately forward the packet to network interface card 140 for transmission.

As shown in FIG. 4A, scheduler 125 stores an identifier associated with the respective packet in a time-indexed data structure (e.g., a timing wheel) 130 at a position associated with the transmission time determined for the packet (stage 340 of FIG. 3). The timing wheel 130 may be a time-indexed data structure or queue capable of storing and extracting packet identifiers based on the determined transmission time of the associated packet. In some implementations, each time-slot in the timing wheel 130 stores a single data element or event (e.g., a packet identifier associated with a packet). In some implementations, each time-slot can store multiple data elements or events. The timing wheel 130 may include a preconfigured number of time-slots or positions and each time-slot or position may represent a specific increment of time. In some implementations, the number of time-slots or positions can be dynamically adjusted based on varying levels of data traffic and congestion at the network device 110. The timing wheel 130 may include any number of time-slots or positions with each time-slot defined as necessary to adequately process the volume of traffic to be shaped. The sum of all slots or positions in the timing wheel 130 represents the time horizon or forward queuing timeframe that the timing wheel 130 is capable of supporting. A suitable time horizon and timing wheel granularity (e.g., the number of time-slots), may be configured based on the rate-limit policy to be enforced. For example, to enforce a rate of 1 megabit (Mb) per second, a suitable time horizon would be 12 milliseconds. A suitable number of time-slots or positions for the timing wheel 130 may be in the range of 10-1,000,000 time-slots or positions. A suitable time horizon for the timing wheel 130 may be in the range of 10 microseconds-1 second. For example, as shown in FIG. 4A, the timing wheel 130 has 10 slots and each slot may represent 2 microseconds. Thus, the time horizon for the example timing wheel 130 shown in FIG. 4A is 20 microseconds and the granularity of the timing-wheel 130 is 2 microseconds. In some implementations, the timing wheel 130 will have a maximum time horizon beyond which no packet identifiers would be scheduled. The timing wheel 130 may not require storing packet identifiers with a timestamp older than now, as the packet with a transmission time older than now should be transmitted immediately. Once a slot in the timing wheel 130 becomes older than now the elements in the slot may be dequeued and prepared for transmission.

For example, as shown in FIG. 4A, assume that the packet A1 has been processed by the scheduler 125 and removed from the socket buffer 405. The packet A1 may remain in the memory 115 and the scheduler 125 stores an identifier associated with the packet A1 (e.g., ID: A1) in the timing wheel 130 at a position associated with the transmission time determined for the packet A1. The packet identifier ID:A1 includes the transmission time $t_0$ as determined by the scheduler 125. The packet identifier ID:A1 is inserted into the timing wheel 130 at a timeslot corresponding to the transmission time $t_0$. The timing wheel 130 stores the packet identifier ID:A1 until it is determined that the transmission time determined for the packet A1 has been reached. The network interface driver 120 may query the time-indexed data structure 130 with the current time to determine whether there are any packets that are to be transmitted. For example, the network interface driver 120 may poll the data structure with the CPU clock time (or some other value representing the current time, such as a regularly incremented integer). The network interface driver 120 determines that the transmission time identified in packet identifier ID:A1 has been reached and packet A1 is transmitted.

As shown in FIG. 4B, the scheduler 125 processes the next packet from the socket buffer 410 to determine a transmission time for the packet B1. The scheduler 125 may determine the packet B1 should be transmitted at a time $t_1$ based on the rate limiting algorithm or policy associated with the class of packets received from the application 150b. The packet B1 may be stored in the memory 115 until the transmission time $t_1$ has been reached. The packet identifier ID:B1 may be stored in the timing wheel 130 at the position associated with the transmission time $t_1$ determined for the packet B1. As further in FIG. 4B, the timing wheel 130 stores the packet identifier ID:A1 and the packet identifier ID:B1 in the time slots corresponding to the transmission times determined by the scheduler 125. For example, the packet identifier ID:A1 is stored in a position associated with the transmission time $t_0$ and the packet identifier ID:B1 is stored in a position associated with the transmission time $t_1$. The packet identifiers ID:A1 and ID:B1 may be stored in the timing wheel 130 until the scheduler 125 determines that the transmission time indexed for each of the packet identifiers has been reached (e.g. at $Time_{Now}$ 420) as described in stage 350 of FIG. 3.

As shown in FIG. 4C, the scheduler 125 continues to process the packets received from the applications 150. For example, the scheduler 125 has processed the packets A2 from the socket buffer 405, the packets B2 from the socket buffer 410 and the packets C1 and C2 from the socket buffer 415. The scheduler 125 processes the packets A2, B2, C1, and C2 to determine a transmission time for each packet. The packets A2, B2, C1, and C2 are stored in the memory 115 until their respective transmission times have been reached. For example, the scheduler 125 may execute a rate limiting algorithm or policy stored in the memory 115 to determine a transmission time associated with the packets A2 and B2. The transmission time for the packet A2 may be determined to be $t_4$ and the transmission time for the packet B2 may be determined to be $t_5$ based on the rate limiting algorithm or policy associated with the packets from application 150a or 150b, respectively. The scheduler 125 also processes packets from the application 150c to determine a transmission time for the packets C1 and C2. The scheduler 125 may determine that the packets from application 150c are associated with a specific rate limiting algorithm or policy which enables the scheduler 125 to process packets from application 150c at twice the rate of the packets from application 150a or application 150b. As shown in FIG. 4C, the scheduler 125 stores the packet identifiers ID:C1 and ID:C2, associated with the packets C1 and C2 respectively, generated by application 150C in the timing wheel 130. The scheduler 125 determines that the packets C1 and C2 have faster transmission times than packets A2 and B2. As a result, the packet identifiers ID:C1 and ID:C2 are stored in the timing wheel 130 in positions associated with the determined faster transmission time. For example, the packet identifiers ID:C1 and ID:C2 are stored in positions closer to Time$_{Now}$ 420 than the packet identifiers ID:A2 and ID:B2.

As further shown in FIG. 4C, the scheduler 125 continues to store identifiers associated with packets A2, B2, C1, and C2, in the timing wheel 130 at positions associated with the transmission time determined for each packet. The timing wheel 130 includes multiple packet identifiers, each containing a determined transmission time for their associated packet. The scheduler 125 will periodically poll the timing wheel 130 to determine that a time in the timing wheel 130 has been reached. For example, the scheduler 125 polls the timing wheel 130 and determines that the time indexed in the timing wheel 130 associated with packet identifier ID:A1 (e.g., $t_0$) has passed or is older than Time$_{Now}$ 420. As a result, the packet identifier ID:A1 is extracted from the timing wheel 130 (shown as a dashed-line ID:A1) and the scheduler 125 executes instructions to forward the packet A1 to the network interface card 140 for transmission. The packet A1 is removed from the memory 115 (e.g., now shown as a dashed-line packet A1 in memory 115). In some implementations, the polling of the timing wheel and the forwarding of packets to the network interface card 140 can be carried out by logic distinct from the scheduler 125, such as the forwarder 135 shown in FIG. 1.

Figure 5:
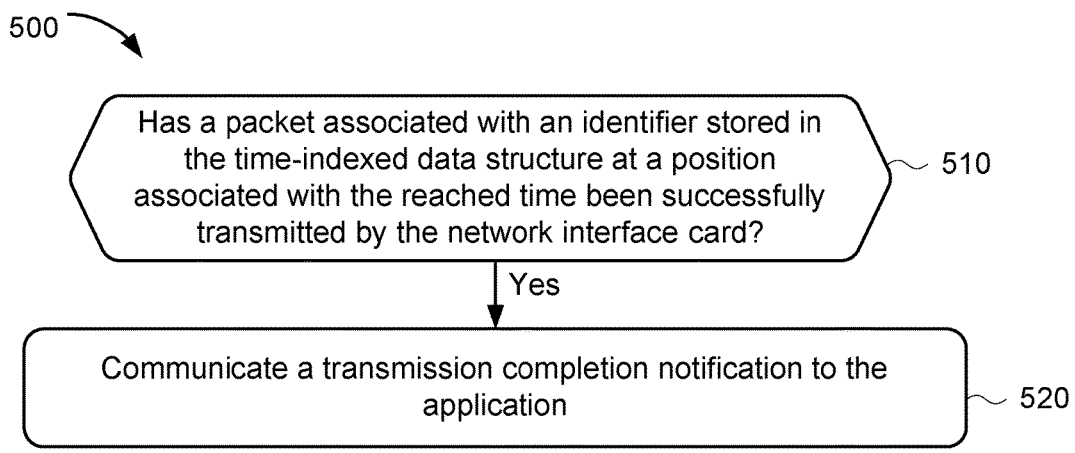
FIG. 5 is a flowchart showing operations of a network device according to some implementations.

FIG. 5 is a flowchart for shaping network traffic using an example method 500 performed by a network device 110. In broad overview, the method 500 begins with stage 510, where a network device, such as the network interface card 140 shown in FIGS. 1 and 6A-6B, determines whether a packet associated with an identifier stored in the time-indexed data structure at a position associated with the reached time been successfully transmitted by the network interface card. At stage 520, if the network device 110 determines that a packet associated with an identifier stored in the time-indexed data structure at a position associated with the reached time been successfully transmitted, the network device 110 communicates a transmission completion notification to the application that has awaited receipt of a transmission completion notification from the network device before forwarding additional data packets to the network device.

Referring to FIG. 5 in more detail, at stage 510, the network device determines whether a packet associated with an identifier stored in the time-indexed data structure at a position associated with the reached time has been successfully transmitted by the network interface card. For example, referring to FIG. 6B in response to a successful completion of the transmission of the packets A1, B1, and C1 by the network interface card 140, the network device informs the applications 150 of the successful transmission of the packets by communicating a single message or multiple transmission completion notifications (e.g., M-A1, M-B1, and M-C1). Based on the notification of a transmission completion from the network interface card 140, the applications 150 determine that each packet associated with an identifier stored in the time-indexed data structure at a position associated with the reached time has been successfully transmitted by the network interface card 140.

At stage 520, in response to the network device determining that a packet associated with an identifier stored in the time-indexed data structure at a position associated with the reached time has been successfully transmitted, the network device communicates a transmission completion notification to the application that has awaited receipt of a transmission completion notification from the network device before forwarding additional data packets to the network device. For example, referring to FIG. 6B, in response to determination that the packet A1 originally sent from the application 150a has been successfully transmitted by the network interface card 140, the network device 110 communicates a transmission completion notification M-A1 to the application 150c. Similarly, in response to determination that the packet B1 originally sent from the application 150b has been successfully transmitted by the network interface card 140, the network device 110 communicates a transmission completion notification M-B1 to the application 150b. In some implementations, the transmission completion notifications can be small (e.g., 32 bytes or including a few 64 bit integers).

In some implementations, each of the applications 150 can be configured to await receipt of a transmission completion notification from the network device 110 before forwarding additional packets to the network device 110. In some implementations, each of the applications 150 can be configured to await receipt of a transmission completion message for a packet of a particular class from the network device 110 before forwarding additional packets of the same class to the network device 110. For example, as shown in FIG. 6B, the applications 150 await receipt of the transmission completion notifications (e.g., M-A1, M-B1, and M-C1) before forwarding the packets A6, B6, and C6 (as shown in dashed lines) to the socket buffers 405, 410, and 415, respectively.

Figure 6A:
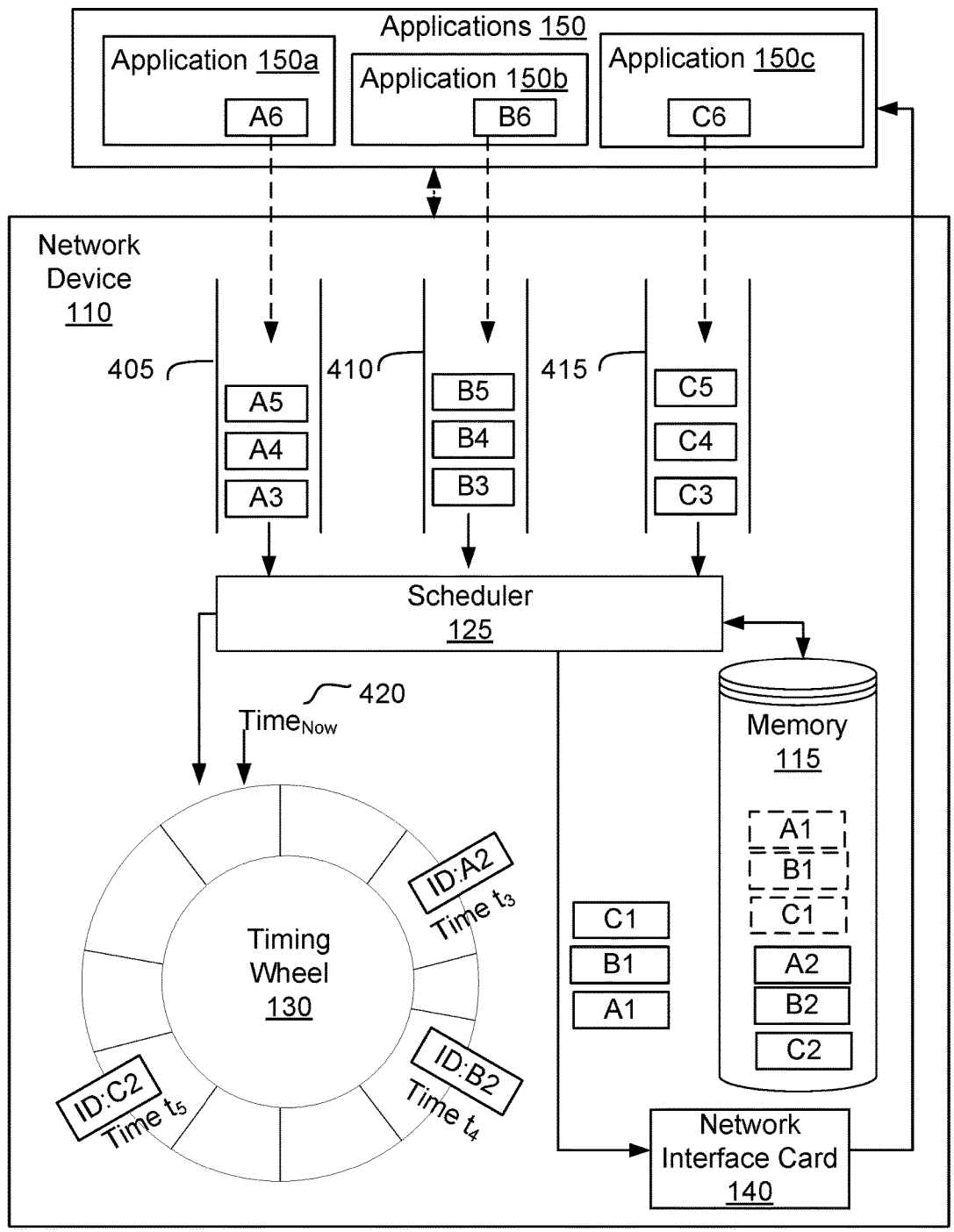
FIGS. 6A-6B are block diagrams representing examples of operations of a network device according to some implementations.
Figure 6B:
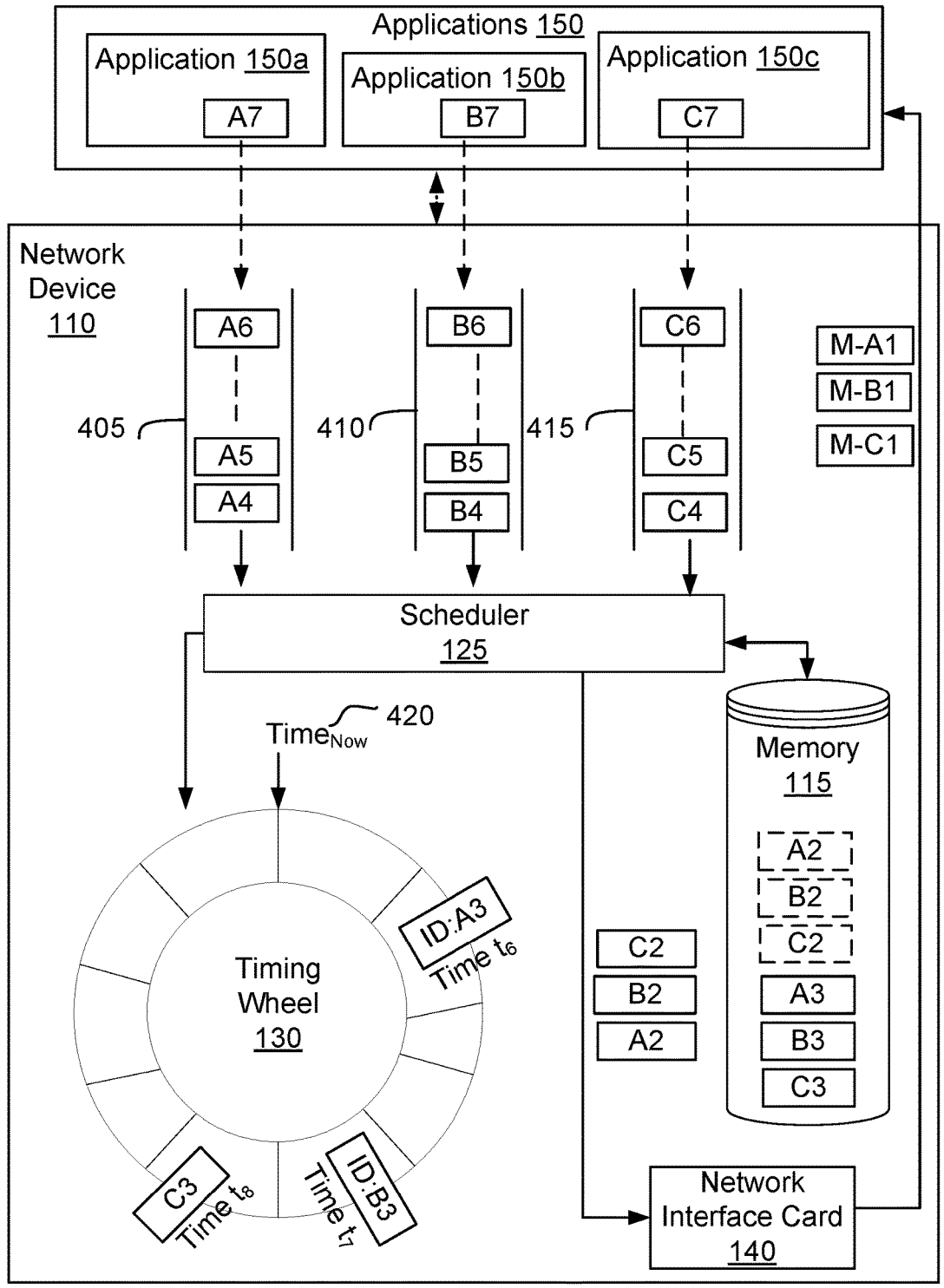

FIGS. 6A-6B are block diagrams representing examples of operations of shaping network traffic using a scheduler, time-indexed data structure and delayed completion of transmission completion notifications according to some implementations. In FIGS. 6A-6B, the same reference numbers as FIGS. 4A-4C are used, with like descriptions omitted.

As shown in FIG. 6A, in broad overview, the network device 110 receives data packets from the applications 150 (e.g., applications 150a, 150b and 150c). The network device 110 includes one or more socket buffers 405, 410, and 415, to queue and process packets received from the applications 150. The network device 110 further includes one or more memory devices 115 and a scheduler 125 to process packets in accordance with the rate limiting algorithms or policies stored in the memory 115. The network device 110 further includes a time-indexed data structure 130, also referred to as timing wheel 130, and stores the packet identifiers according to their transmission time. The network device 110 also includes one or more network interface cards 140 to transmit the packets. The network interface card 140 communicates transmission completion notifications to applications 150. In some implementations, the network interface card 140 creates backpressure by delaying the transmission completion notifications to the applications 150. Network device 110 may rate limit network traffic by delaying the transmission completion notifications until the network interface card 140 has successfully transmitted a packet. Delaying transmission completion notifications may prevent the applications 150 from generating additional packets for processing by the network device 110. In some implementations, the network device 110 may utilize TCP small queues at the socket buffer to limit the number of packets that may be processed by the network device. TCP small queues is a flow-limiting mechanism known to persons of ordinary skill in the art that may be configured in a TCP protocol stack that is designed achieve smaller buffer sizes and reduce the number of TCP packets in transmission queues at a given time. The use of TCP small queues may allow the delayed completion mechanism to achieve lower memory utilization due to the reduced number of packets in transit at a given time.

As shown in FIG. 6A, and stage 310 of FIG. 3, a network device 110 receives packets at the TCP layer from a plurality of applications 150 (e.g., applications 150a, 150b or 150c). Network device 110, as shown in FIG. 6A includes three socket buffers (405, 410 and 415). For illustrative purposes, it is assumed that the packets from the application 150a are queued and processed in the socket buffer 405, the packets from the application 150b are queued and processed in the socket buffer 410, and the packets from the application 150c are queued and processed in the socket buffer 415. The network device 110 may also or alternatively include one or more socket buffers that process packets from multiple applications. As shown in FIG. 6A, packets from application 150a are received by the socket buffer 405 in sequential order of their transmission by application 150a. For example, the packet A1 was the initial or first packet transmitted from the application 150a and has been processed by the scheduler 125 for transmission. The packet A2 has been processed by the scheduler 125 to determine a transmission time (e.g., $t_3$) and a packet identifier ID:A2 has been stored in the timing wheel 130 at a position associated with the transmission time $t_3$. The packets A3-A5 remain queued in the socket buffer 405 awaiting processing by the scheduler 125. The packet A6 remains with the application 150a, awaiting receipt by the application 150a of a transmission completion notification associated with one or more packets previously forwarded by the application 150a to the socket buffer 405 before being forwarded (as shown by dashed lines) to the socket buffer 405. Similarly, the application 150b may generate and transmit packets to the socket buffer 410. For example, the packet B1 was the initial or first packet transmitted from the application 150b and has been processed by the scheduler 125 for transmission. The packet B2 has been processed by the scheduler 125 to determine a transmission time (e.g., $t_4$) for the packet and a packet identifier ID:B2 has been stored in the timing wheel 130 at a position associated with the transmission time $t_4$. The packets B3-B5 remain queued in the socket buffer 410 awaiting processing by the scheduler 125. The packet B6 remains with the application 150b, awaiting receipt by the application 150b of a transmission completion notification associated with one or more packets previously forwarded (as shown by dashed lines) to the socket buffer 410. As further shown in FIG. 6A, the packet C1 was the initial or first packet transmitted from application 150c and has been processed by the scheduler 125 for transmission. The packet C2 has been processed by the scheduler 125 to determine a transmission time (e.g., $t_5$) for the packet and a packet identifier ID:C2 has been stored in the timing wheel 130 at a position associated with the transmission time $t_5$. The packets C3-C5 remain queued in the socket buffer 415 awaiting processing by the scheduler 125. The packet C6 remains with the application 150c, awaiting receipt by the application 150c of a transmission completion notification associated with one or more packets previously forwarded (as shown by dashed lines) to the socket buffer 415.

As shown in FIG. 6A, the scheduler 125 has determined that the times indexed in the timing wheel 130 and associated with the transmission times of packets A1, B1, and C1 have been reached (or passed). The packets A1, B1, and C1 have been removed from the memory 115 (e.g., now shown as dashed-line packets A1, B1, and C1 in memory the 115) and are forwarded to the network interface card 140 for transmission. The scheduler 125 has processed the packets A2, B2 and C2 to determine a transmission time for each packet and has stored an identifier associated with each packet in the timing wheel 130 at a position associated with the transmission time determined for each packet. For example, the packet identifier ID:A2 has been stored in a position associated with transmission time $t_3$ and the packet identifier ID:B2 is stored in a position associated with transmission time $t_4$. Similarly, the packet identifier ID:C2 is stored in a position associated with transmission time $t_5$. The packets A2, B2, and C2 are stored in the memory 115.

As shown in FIG. 6B, the scheduler 125 processes the next packets from the socket buffers 405, 410, and 415 to determine a transmission time for the packets A3, B3, and C3. The scheduler 125 determines that the packet A3 should be transmitted at time $t_6$ based on the rate limiting algorithm or policy associated with the class of packets received from the application 150a. The packet A3 is stored in the memory 115 until the transmission time $t_6$ has been reached. The scheduler 125 determines that the packet B3 should be transmitted at time $t_7$ based on the rate limiting algorithm or policy associated with the class of packets received from application 150b. The packet B3 is stored in the memory 115 until the transmission time $t_7$ has been reached. The packet identifier ID:B3 is stored in the timing wheel 130 at the position associated with the transmission time $t_7$ determined for the packet B3. The scheduler 125 determines the packet C3 should be transmitted at time $t_8$ based on the rate limiting algorithm or policy associated with the class of packets received from application 150c. The packet C3 is stored in the memory 115 until the transmission time $t_8$ has been reached. The packet identifier ID:C3 is stored in the timing wheel 130 at the position associated with the transmission time $t_8$ determined for the packet B3. The timing wheel 130 stores the packet identifiers ID:A3, ID:B3, and ID:C3 in time positions corresponding to the transmission times determined by the scheduler 125. The packet identifiers ID:A3, ID:B3, and ID:C3 are stored in the timing wheel 130 until the scheduler 125 determines that the transmission time indexed for each packet identifier has been reached (e.g. at $Time_{Now}$ 420).

As further shown in FIG. 6B, the scheduler 125 has determined that the time indexed in the timing wheel 130 associated with the packets A2, B2, and C2 has been reached and executes instructions to forward the packets A2, B2, and C2 to the network interface card 140. The packets A2, B2, and C2 have been removed from the memory 115 (e.g., now shown as dashed-line packets A2, B2, and C2 in memory 115) and are forwarded to the network interface card 140 for transmission.

As shown in FIG. 6B, the network interface card 140 communicates a transmission completion notification to applications 150. Based on the network interface card 140 transmitting the packets A1, B1, and C1, a transmission completion notification is communicated to the applications 150a, 150b, and 150c, respectively. For example, the application 150a receives the transmission completion notification M-A1 based on successful transmission of the packet A1 by the network interface card 140. Application 150a is prevented from forwarding additional packets for transmission until the application 150*a* receives the transmission completion notification M-A1. As a result of receiving the transmission completion notification M-A1, corresponding to successful transmission of packet A1, the application 150*a* forwards the packet A6 to the socket buffer 405 of the network device 110. The application 150*a* is prevented from sending additional packets to the network device 110 until the application 150*a* receives the next transmission completion notification. As a result, the packet A7 remains with the application 150*a* and has not been forward to the socket buffer 405 of network device 110. In some implementations, the network device 110 may be configured to receive a predetermined number of packets from one of the plurality of applications prior to preventing one of the applications from sending additional packets for transmission. In some implementations, the transmission completion notifications may be delayed to assist shaping network traffic. For example, communication of transmission completion notifications may be delayed until after the packet has been transmitted from the network interface card 140. Delaying the communication of the transmission completion notifications back to the source applications 150 reduces the number of new packets generated by the applications 150 and reduces the number of packets transmitted to network device 110. In some implementations, the transmission completion notifications may be communicated in a delayed manner in the order the packet was processed by the network interface card 140. For example, the transmission completion notifications M-A1, M-B1, and M-C1 are communicated in the same order or a different order compared to the order the receipt packets were received at the network interface card 140. The transmission completion notifications are communicated in the same or different order that the packets were received after packets A1, B1, and C1, respectively, have been transmitted from the network interface card 140. Delayed completion of transmission completion notifications, when performed by transmitting the completion notifications out of order can reduce head of line blocking in the network device 110. In some implementations, the transmission completion notifications can be small (e.g., 32 bytes or including a few 64 bit integers). As further shown in FIG. 6B, based on based on the applications 150 receiving a transmission completion notification for the packets A1, B1, and C1, the network device 110 receives the next sequential packets (e.g., packets A6, B6, and C6) from the applications 150 in the socket buffers 405, 410 and 415, respectively.

Figure 7A:
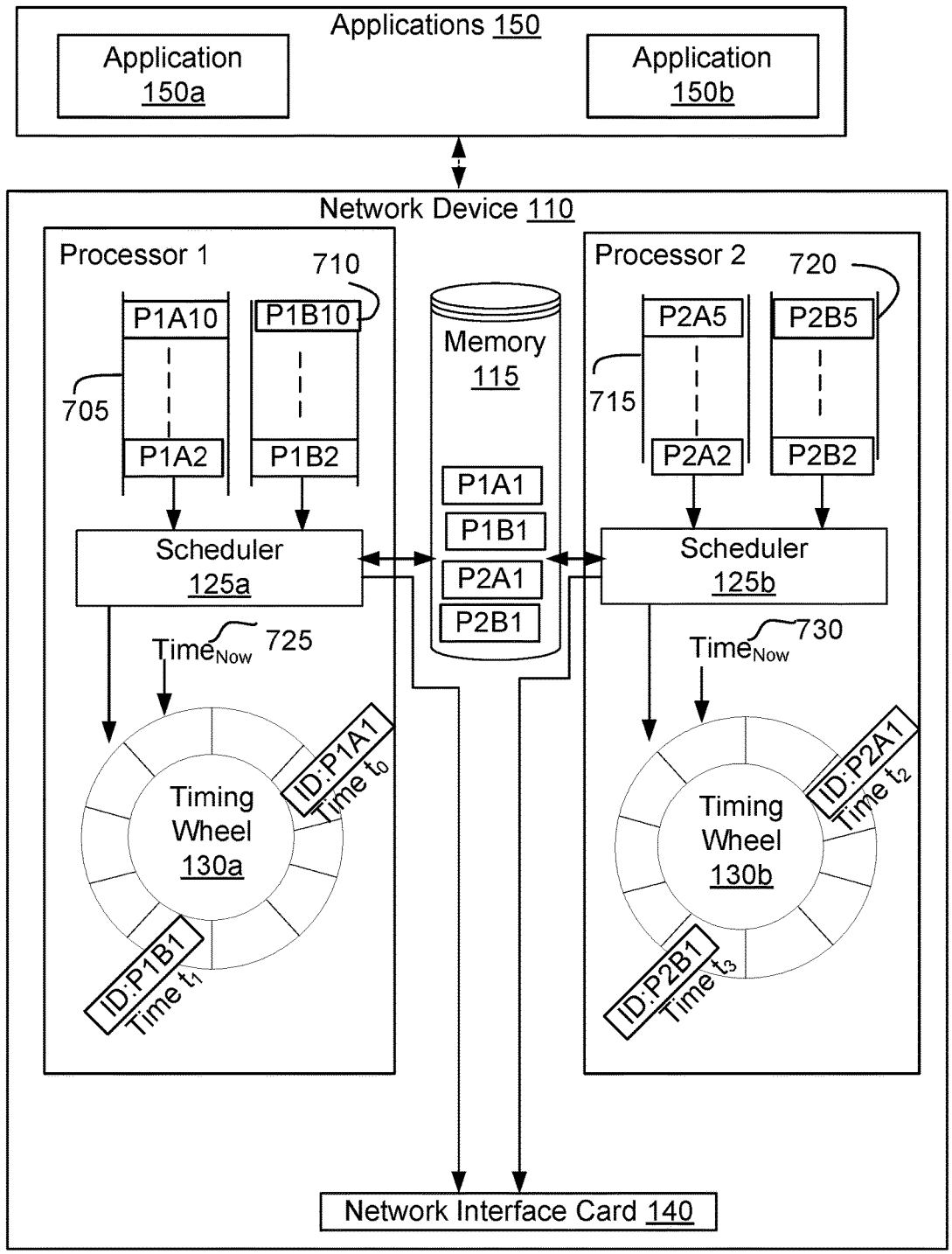
FIGS. 7A-7C are block diagrams representing examples of operations of a network device according to some implementations.
Figure 7B:
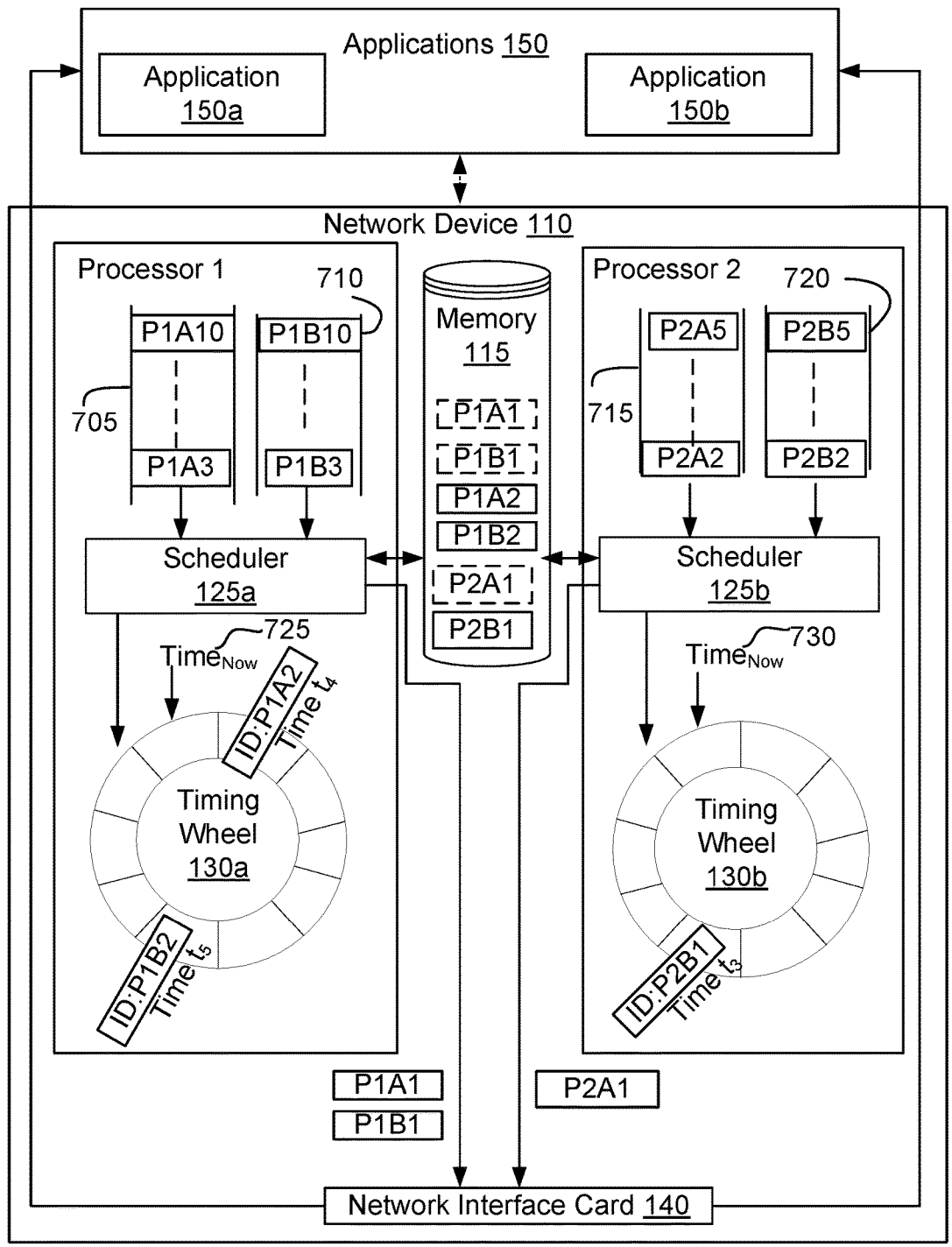
Figure 7C:
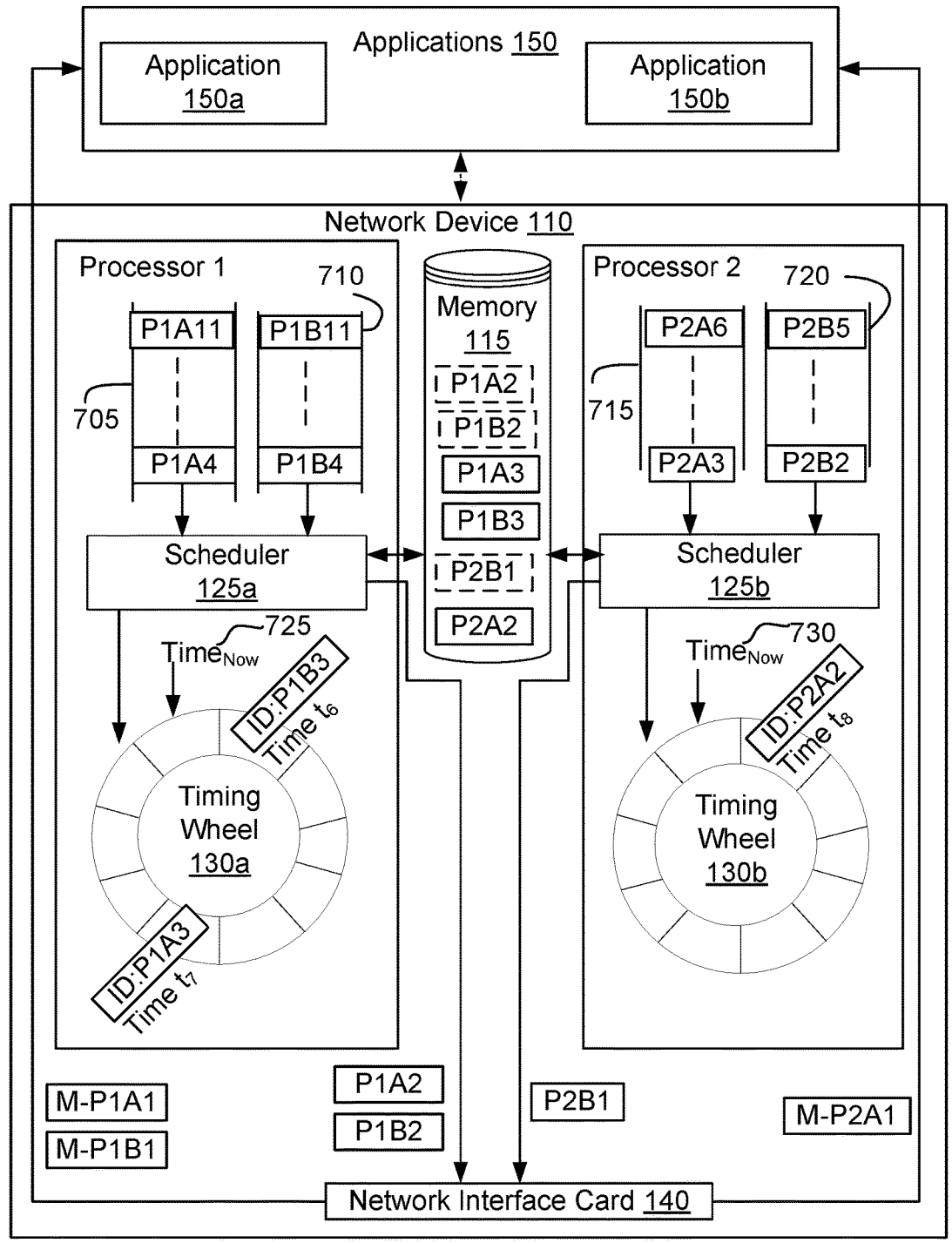

FIGS. 7A-7C are block diagrams representing examples of network device operations for shaping network traffic using multiple schedulers, multiple time-indexed data structures and delayed completion of transmission completion notifications according to some implementations.

The network device 110 includes two processors, shown as Processor 1 and Processor 2, a memory 115 and a network interface card 140. Each processor includes one or more socket buffers (e.g., socket buffers 705 and 710 included in Processor 1 and socket buffers 715 and 720 in Processor 2) and one or more schedulers (e.g., scheduler 125*a* in Processor 1 or scheduler 125*b* in Processor 2). Each processor includes one or more time-indexed data structures, also referred to as a timing wheel (e.g., timing wheel 130*a* in Processor 1 or timing wheel 130*b* in Processor 2).

As further shown in FIG. 7A, the network device hosts multiple applications 150, including application 150*a* and application 150*b*, each generating data packets for transmission by the network device 110. In some implementations, applications 150*a* and 150*b* may forward packets to either Processor 1 or Processor 2, exclusively. In some other implementations, one or both of the applications 150*a* and 150*b* may forward packets to both Processor 1 and Processor 2 at equal or disparate rates. As shown in FIG. 7A, packets received from the application 150*a* are received by Processor 1 in the socket buffer 705. The packets received from the application 150*b* are received by Processor 1 in the socket buffer 710. For example, as shown in FIG. 7A, the packets P1A1 through P1A10 are received from application 150*a* and the packets P1B1 through P1B10 are received by the socket buffer 710 of Processor 1. Similarly, as shown in FIG. 7A, the packets received from application 150*a* are received by Processor 2 in the socket buffer 715. The packets received from application 150*b* are received by Processor 2 in the socket buffer 720. For example, the packets P2A1 through P2A5 are received by the socket buffer 715 from application 150*a* and the packets P2B1 through P2B5 are received by the socket buffer 720 of Processor 2 from application 150*b*.

As further shown in FIG. 7A, the network device 110 includes the memory 115 that is shared by Processor 1 and Processor 2. In some implementations, the memory 115 may not be shared and each processor may have its own memory 115. The memory 115 may store data packets as well as rate limiting algorithms or policies used by the scheduler 125 to determine transmission times for each packet. Each Processor 1 and Processor 2 include a scheduler 125 to process received packets and determine a transmission time according to the appropriate rate limiting algorithm or policy corresponding to each particular packet class or application packet flow. For example, Processor 1 includes a scheduler 125*a* process packets associated with application 150*a* and application 150*b*. Similarly, Processor 2 includes a scheduler 125*b* to process packets received from application 150*a* and application 150*b*. Each scheduler 125 may be configured with unique logic or processing instructions to implement rate limiting algorithms or policies associated with the class or type of data packets it processes or based on processor memory or power specifications.

In some implementations, the network interface driver 120 may execute instructions to manage and/or adjust the aggregate rate of packets to be transmitted for a particular class or flow of packets across one or more processors. In some implementations, the network interface driver 120 may utilize the statistical data stored in the memory 115 to determine processor specific rate limits to be applied to a particular class or flow of packets. For example, the network interface driver 120 may determine a specific rate limit for Processor 1 based on the historical average for the proportion of packets of a given class that are sent to Processor 1. For example, if historically, 70 percent of the total number of packets of a given class are transmitted through Processor 1, the scheduler 125*a* of Processor 1 may utilize a rate limit for that class of packets that is 70% of the aggregate rate limit for that class. Statistical data about the distribution of packets in various classes among the processors can be maintained in the memory, and the processor specific rate limits can be updated as the packet distributions among the processors change over time.

As further shown in FIG. 7A, Processor 1 includes a timing wheel 130*a* and Processor 2 includes a timing wheel 130*b*. In some implementations, each processor may be configured with its own timing wheel 130 and in other implementations, the processors may share a timing wheel 130. Each timing wheel 130 is a time-indexed data structure storing packet identifiers at positions in the time-indexed data structure associated with transmission times determined for each packet. Also shown in FIG. 7A, the network device 110 includes a network interface card 140 to transmit packets based on the scheduler 125 (e.g., scheduler 125a or scheduler 125b) determining that a time-indexed in the timing wheel 130 (e.g., timing wheel 130a or timing wheel 130b) has been reached. In some implementations Processor 1 and Processor 2 may each include their own network interface card 140, respectively. The network interface card 140 may also communicate a transmission completion notification back to applications 150 to assist rate limiting packet generation from applications 150.

As shown in FIG. 7A, scheduler 125a of Processor 1 processes received packets from the socket buffer 705 and 710 to determine a transmission time for each packet. Scheduler 125a stores an identifier associated with the respective packet in the timing wheel 130a at a position associated with the transmission time determined for the packet. For example, the packet identifiers ID:P1A1, the first sequential packet generated from application 150a, have been processed by scheduler 125a and stored in the timing wheel 130a at a position associated with the determined transmission time (e.g., $t_0$). Similarly, the packet identifier ID:P1B1, the first sequential packet associated with application 150b, has been processed by scheduler 125a and stored in the timing wheel 130a at a position associated with the determined transmission time (e.g., $t_1$). The packet identifiers ID:P1A1 and ID:P1B1 are stored in the timing wheel 130a until the scheduler 125a determines that a time indexed in the timing wheel 130a has been reached. For example, the scheduler 125a periodically polls the timing wheel 130a to determine if the transmission time associated with the packet identifier ID:P1A1 or ID:P1B1 is older than the present time or $Time_{Now}$ 725. In some implementations, the polling of the timing wheel and the forwarding of packets to the network interface card 140 can be carried out by logic distinct from the scheduler 125, such as the forwarder 135 shown in FIG. 1. The packets P1A1 and P1B1 remain in the memory 115 until the scheduler 125a has determined that the transmission time associated with each packet has been reached. Similarly, as further shown in FIG. 7A, the scheduler 125b of Processor 2 processes received packets from socket buffer 715 and 720 to determine a transmission time for each packet. Scheduler 125b stores an identifier associated with the respective packet in the timing wheel 130b at a position associated with the transmission time determined for the packet. For example, the packet identifiers ID:P2A1, the first sequential packet generated from application 150a, have been processed by the scheduler 125b and stored in the timing wheel 130b at a position associated with the determined transmission time (e.g., $t_2$). Similarly, the packet identifier ID:P2B1, the first sequential packet associated with application 150b, has been processed by the scheduler 125b and stored in the timing wheel 130B at a position associated with the determined transmission time (e.g., $t_3$). The packet identifiers ID:P2A1 and ID:P2B1 are stored in the timing wheel 130b until the scheduler 125b determines that a time indexed in timing wheel 130b has been reached. For example, the scheduler 125b periodically polls the timing wheel 130b to determine if the transmission time associated with the packet identifier ID:P2A1 or ID:P2B1 is older than the present time or $Time_{Now}$ 730. The packets P2A1 and P2B1 remain in the memory 115 until the scheduler 125b determines that the transmission time associated with each packet has been reached.

As shown in FIG. 7B, the scheduler 125a has processed the packets P1A2 and P1B2 from the socket buffer 705 and 710, respectively, to determine a transmission time for each packet. Based on determining a transmission time for each packet, the scheduler 125a stores an identifier associated with each packet in the timing wheel 130a at a position associated with the determined transmission time. For example, the packet identifiers ID:P1A2 and ID:P1B2 are stored in timing wheel 130a at positions associated with their determined transmission times (e.g., $t_4$ and $t_5$, respectively). The packets P1A2 and P1B2 are stored in the memory 115. The scheduler 125a periodically polls timing wheel 130a to determine if a time indexed in the timing wheel 130a has been reached by comparing the determined transmission time for each packet to the current time, $Time_{Now}$ 725. For example, based on determining the time indexed for packet P1A1 (e.g., $t_0$) and packet P1B1 (e.g., $t_1$), has been reached, the scheduler 125a executes instructions to forward packets P1A1 and P1B1 to the network interface card 140 for transmission. The packets P1A1 and P1B1 are removed from the memory 115 (as shown in dashed lines).

As shown in FIG. 7B, the scheduler 125b has polled the timing wheel 130b and determined that the time indexed in the timing wheel 130b has been reached for packet P2A1 (730). For example, based on determining the time indexed for packet P2A1 has been reached, the scheduler 125b executes instructions to forward the packet P2A1 to the network interface card 140 for transmission. The packet P2A1 is removed from the memory 115 (as shown in dashed lines).

As shown in FIG. 7C, Processor 1 continues to receive new packets from applications 150 and scheduler 125a continues to process the received packets at a faster rate than scheduler 125b of Processor 2. The scheduler 125a has processed the packets P1A3 and P1B3 from the socket buffer 705 and 710, respectively, to determine a transmission time for each packet. Based on determining a transmission time for each packet, the scheduler 125a stores an identifier associated with each packet in the timing wheel 130a at a position associated with the determined transmission time. For example, the packet identifiers ID:P1A3 and ID:P1B3 are stored in the timing wheel 130A at positions associated with their determined transmission times (e.g., $t_6$ and $t_7$, respectively). The packets P1A3 and P1B3 are stored in the memory 115. The scheduler 125a periodically polls the timing wheel 130a to determine if a time indexed in timing wheel 130a has been reached by comparing the determined transmission time for each packet to the current time, $Time_{Now}$ 725. For example, based on determining the time indexed for packet P1A2 and packet P1B2 has been reached, the scheduler 125a executes instructions to forward the packets P1A2 and P1B2 to the network interface card 140 for transmission. The packets P1A2 and P1B2 are removed from the memory 115 (as shown in dashed lines).

As further shown in FIG. 7C, based on the network interface card 140 transmitting packets P1A1 and P1B1, a transmission completion notification is communicated to applications 150. For example, the network interface card 140 has successfully transmitted the packets P1A1 and P1B1 and in response to successful transmission, communicates a transmission completion notification (e.g., M-P1A1 and M-P1B1), for each packet respectively, to the application 150 that originally generated the packet. The application 150a will be prevented from sending additional packets for transmission until it receives the transmission completion notification M-P1A1. Similarly, the application 150b will be prevented from sending additional packets for transmission until it receives the transmission completion notification M-P1B1. Based on receiving the transmission completion notifications, the applications 150 may forward new packets (e.g., P1A11 and P1B11) to the network device socket buffers 705 and 710, respectively, for processing by the scheduler 125*a*.

As shown in FIG. 7C, the scheduler 125*b* has processed packets P2A2 from the socket buffer 715, while no new packets have been processed from the socket buffer 720 for application 150*b*. The scheduler 125*b* has determined a transmission time for the packet P2A2 and stored the identifier ID:P2A2 in the timing wheel 130B at a position associated with the determined transmission time. The packets P2A2 is stored in the memory 115. The scheduler 125*b* periodically polls the timing wheel 130*b* to determine if a time indexed in the timing wheel 130*b* has been reached by comparing the determined transmission time for each packet to the current time, Time$_{Now}$ 730 and based on determining the time indexed for packet P2B1 has been reached, the scheduler 125*b* executes instructions to forward the packet P2B1 to the network interface card 140 for transmission. The packet P2B1 is removed from the memory 115 (as shown in dashed lines).

As further shown in FIG. 7C, based on network interface card 140 transmitting packets P2A1, a transmission completion notification is communicated to applications 150 after the packet P2A1 has been transmitted from the network interface card 140. The application 150*a* is prevented from sending additional packets for transmission until it receives the transmission completion notification M-P2A1. Based on receiving the transmission completion notification, the application 150*a* may forward a new packet (e.g., P2A6) to the network device socket buffers 715 for processing by the scheduler 125*b*.

Figure 8:
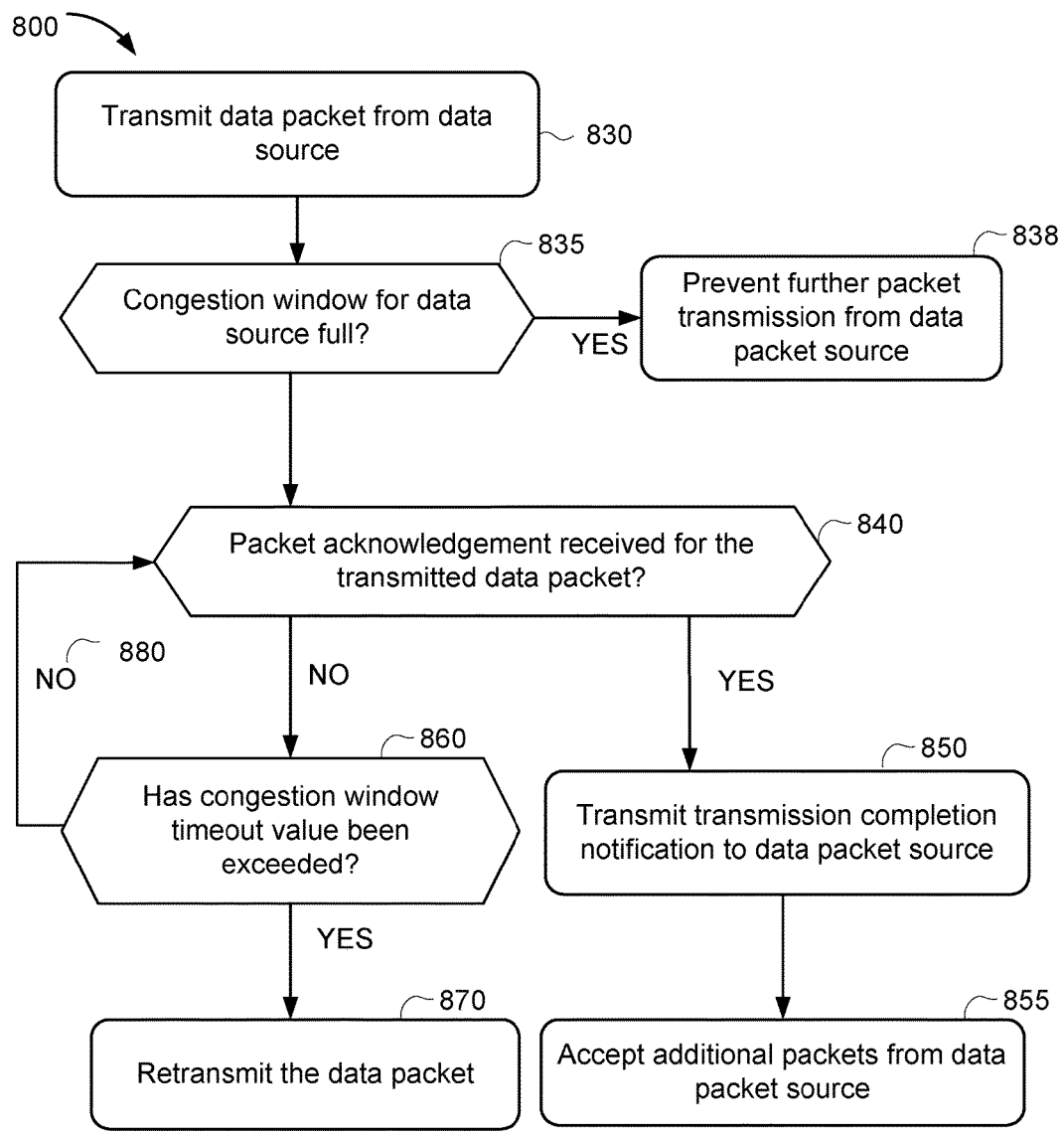
FIG. 8 is a flowchart showing operations of a network device according to some implementations.
Figure 9:
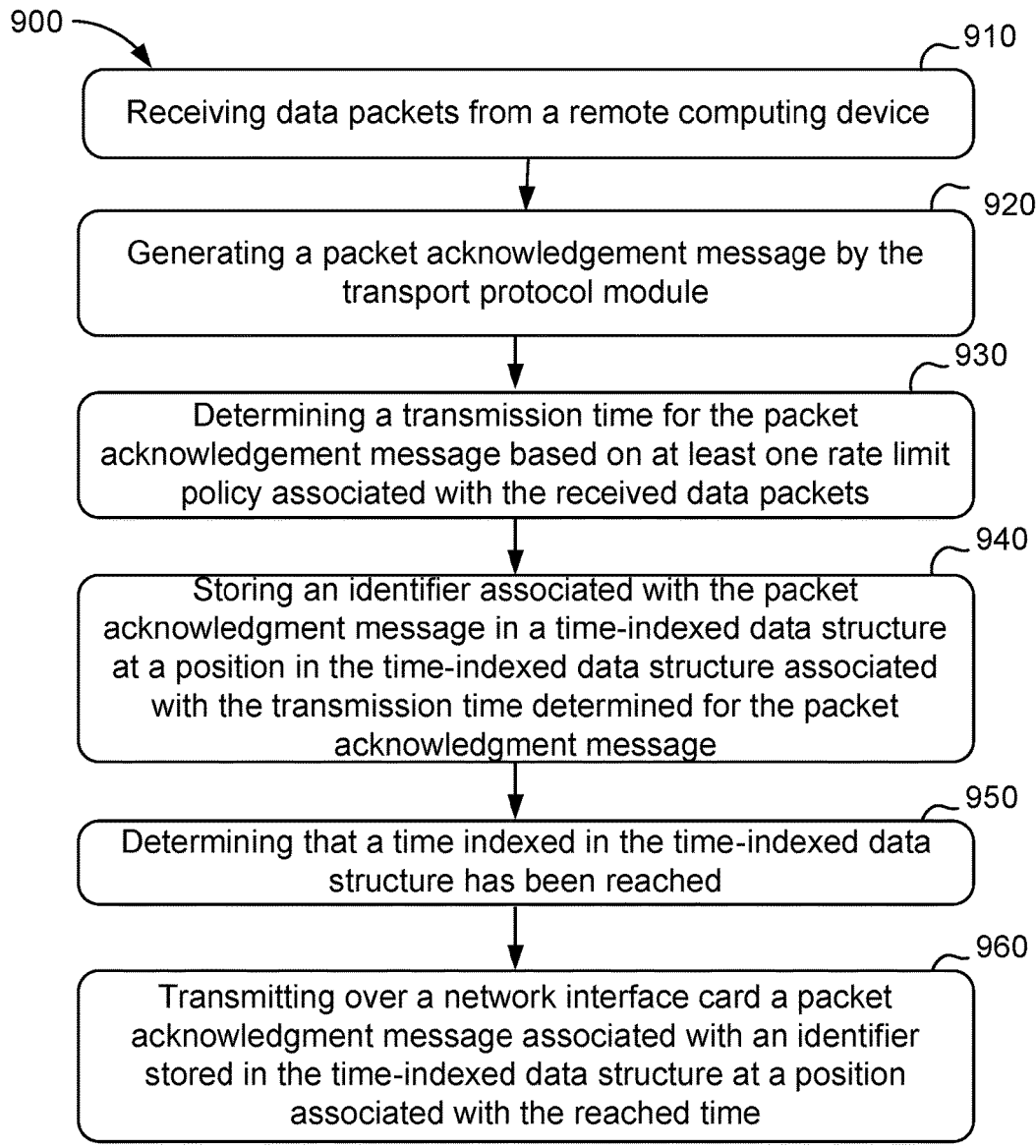
FIG. 9 is a flowchart showing operations of a network device according to some implementations.

As described above, the time-indexed data structure and the delayed completion mechanisms can be used to rate limit network traffic at a transmitting network device. Similar mechanisms can also be employed at a receiving network device to schedule the acknowledgement data packet receipts to implement a receiver-side rate limiting technique. In some implementations, a receiver-side rate limiting technique can leverage modified versions of existing functionality of the TCP protocol, namely the transmitting device's TCP congestion window, to limit the rate at which the transmitting device sends future packets. As a person of ordinary skill in the art would appreciate, the TCP congestion window is a dynamically adjusted threshold of the amount of TCP data that a transmitting device can have sent without yet being acknowledged as received. That is, when the amount of data in unacknowledged transmitted TCP packets meets the TCP congestion window threshold, the transmitting device cannot send any additional packets. As a result, a receiving device can manipulate when a transmitting device can send additional packets by controlling the time at which it sends a TCP acknowledgement message (TCP ACK) back to the transmitting device. In some implementations, for example where the transmitting device executes in containerized or virtual machine environments, separate TCP congestion windows may be maintained within each virtual machine or each container, allowing the rate at which packets from each virtual machine or container to be controlled separately. In some implementations, separate TCP congestion windows may be maintained for each flow of packets transmitted by the transmitting device in a transport protocol module operating on or within the real OS of the transmitting device. In some implementations, the modified congestion window functionality can include a completion notification feature in which applications, virtual machines, and/or container environments cannot forward additional packets to the transport protocol module operating on or in the real OS of the transmitting device sends a transmission completion notification message to the respective application, virtual machine, or container environment. Such completion notification message are sent by the TCP protocol message upon receipt of a TCP ACK message from the receiver side confirming previously sent packets were indeed successfully received. This functionality is described further in relation to FIGS. 8 and 9, below. FIG. 8 shows a flow chart of an example set of transmitter-side operations associated with the above-described receiver-side rate limiting technique. FIG. 9 shows a flow chart of an example set of receiver-side operations associated with the receiver-side rate limiting technique.

FIG. 8 is a flowchart for shaping network traffic using an example method 800 performed by a transmitting network device 110. In broad overview, the method 800 begins with stage 830, where a network device 110 transmits a data packet from a data source to a network device 110. At stage 835, if the congestion window for the data source is full, the method includes preventing the data packet from sending further data packets to the transport protocol module of the network device until a completion notification is received by the data source as shown in stage 838. At stage 840, if the network device 110 determines that a packet acknowledgement has been received for the transmitted data packet from destination device, the network device 110 communicates a transmission completion notification to the data packet source as shown in stage 850 and, had the congestion window for that data source previously been full, allows the transport protocol module of the network device to accept additional packets from the packet data source as shown in stage 855. At stage 860, if a packet acknowledgement message has not been received for the transmitted data packet, the network device 110 determines whether the congestion window timeout value has been exceeded. At stage 870, if the congestion window timeout value has been exceeded, the network device 110 retransmits the data packet. At stage 880, if the network device 110 determines that the congestion window timeout value has not been exceeded, the network device 110 re-determines if a packet acknowledgment message has been received for the transmitted data packet.

Referring to FIG. 8 in more detail, at stage 830, the transmitting network device 110 transmits a data packet from a data source to the receiving network device 110. For example, the data source can be an application executing on the network device. As with the sender-side rate limiting techniques described above, the applications serving as data sources 150 may be hosted on a real operating system of the network device 110, within a virtual machine hosted on the network device 110, or within a containerized execution environment hosted by the network device 110.

At stage 835, a transport protocol module, such the TCP layer of a network protocol stack, determines whether a congestion window associated with the transmitted packet has become full due to the transmission of the packet. The network device 110, through a transport protocol module can maintain congestion windows, for example, a TCP congestion window, for various data sources. The network device 110 can maintain a separate congestion window for each application executing on the network device 110, for each virtual machine or containerized environment hosted by the network device 110, or for each flow of packets transmitted by the network device 110. The congestion window defines a maximum amount of data that can have been transmitted by the device for the application, virtual machine, container, flow, etc. which has not yet been acknowledged by the target destination device as having been received. In some implementations, the congestion window is initially set to a value of twice maximum segment size at initialization of a link or after a timeout occurs, though other values can be used, too. If the transmission of the data packet transmitted at stage 830 leads to the congestion window associated with that data packet becoming full, the network device 110 can prevent further forwarding of data packets from the data source that originated the packet to the transport protocol module of the network device 110 until the data source receives a completion notification message indicating some of the packets it had previously caused to be transmitted had been received. In some implementations in which a particular congestion window is used with respect to multiple applications, upon determining the congestion window is full, the network device can prevent each of the applications associated with that congestion window from forwarding additional packets to the transport protocol module of the network device 110. Preventing the forwarding of packets to the transport protocol module while a congestion window is full (at stage 838) relieves memory constraints associated with queues within the transport protocol module.

At stage 840, the network device 110 determines if a packet acknowledgement message has been received for the transmitted data packet. For example, the transmitting network device 110 may determine that the data packet was successfully transmitted upon receiving a TCP ACK packet from the receiving destination network device 110.

At stage 850, in response to the network device 110 determining that a TCP ACK has been received for the transmitted data packet, the network device 110 transmits a transmission completion notification to the packet data source. For example, the transmission protocol module 145 of the transmitting network device 110 may transmit a transmission completion notification to the data source that originated the packet whose receipt is being acknowledged. The receipt of a transmission completion notification by the data packet source serves to inform the data packet source, such as applications 150, that additional data packets may be queued for transmission (stage 855).

As further shown in FIG. 8, at stage 860, based on not receiving a packet acknowledgement message for the transmitted data packet, the transmitting network device 110 determines if the congestion window timeout value has been exceeded. In some implementations, the transmitting network device 110 may be configured with separate congestion windows for each class of packets to be transmitted. For example, the transmitting network device 110 may be configured with multiple congestion windows, each corresponding to a different class of packets, for example the data packets generated by each of the applications 150 (e.g., 150*a*, 150*b*, and 150*c*).

At stage 870, if the network device 110 determines that the congestion window timeout value has been exceeded, the network device 110 retransmits the data packet. The timeout value is set as a timer threshold and represents a conservative estimate of when a transmitted data packet will be acknowledged by the receiving network device 110. If the timer expires without receiving an acknowledgement message indicating receipt of the packet by the destination (e.g., a TCP ACK message), the transmitting network device 110 will attempt to retransmit the data packet.

At stage 880, if the network device 110 determines that the TCP congestion window timeout value has not been exceeded, the network device 110 re-determines whether a packet acknowledgement message has been received for the previously transmitted data packet.

FIG. 9 shows a flow chart of an example set of receiver-side operations associated with the receiver-side rate limiting technique performed by a network device, such as the network device 110 shown in FIG. 1. The method 900 includes receiving data packets from a remote computing device (stage 910) and generating a packet acknowledgement message by the transport protocol module 145 of the network device 110 receiving the data packet (stage 920). The method further includes determining a transmission time for the packet acknowledgement message based on at least one rate limit policy associated with the received data packets (stage 930) and storing an identifier associated with the packet acknowledgement message packet in a time-indexed data structure at a position in the time-indexed data structure associated with the transmission time determined for the packet acknowledgement message (stage 940). The method 900 also includes determining that a time indexed in the time-indexed data structure has been reached (stage 950) and transmitting over a network interface card of the network device 110 a packet acknowledgement message associated with an identifier stored in the time-indexed data structure at a position associated with the reached time (stage 960).

The method 900 includes receiving data packets from a remote computing device 110 (stage 910). The remote computing device 110 may be any network device 110 capable of generating data packets. In some implementations, the remote computing device is configured to control the transmission of data packets using the method 800 shown in FIG. 8. The method 900 also includes generating a packet acknowledgement message (e.g., a TCP ACK message) by a transport protocol module (such as a TCP protocol module or the TCP layer of the network stack) (stage 920). As discussed above, a packet acknowledgement message packet is transmitted by the network device 110 receiving the data packets to the network device 110 that has transmitted the data packets to acknowledge that the transmitted data has been received.

As further shown in FIG. 9, a transmission time for the packet acknowledgement message is determined based on at least one rate limit policy associated with the received data packets (stage 930). In some implementations, the network interface driver 120 of the network device 110 may determine a transmission time for each packet acknowledgement message based on a rate limiting algorithm or policy stored in memory 115 that is associated with the received data packets. For example, the network interface driver 120 may apply a transmission timestamp to the packet acknowledgement message in accordance with a rate limiting algorithm or policy associated with the particular class of received data packets. Additionally, or alternatively, each packet acknowledgement message may have a requested transmission timestamp generated by the transport protocol module. In some such implementations, the network interface driver 120 may determine an updated transmission time based on at least one rate limiting policy associated with the received packets being exceeded and invoking a rate limit algorithm associated with the received data packet. For example, if a data packet associated with a rate limited class of packets is received, and the network interface driver 120 determines that the transmission time for the packet acknowledgement message will result in additional data transmissions from the same transmitting device such that corresponding rate limit will be exceeded, the network interface driver 120 may update the transmission time with an adjusted transmission timestamp that causes the packet acknowledgement message to be transmitted at a later time, effectively reducing the transmission rate of the transmitting network device 110 associated with that class of packets. In some implementations, the network interface driver 120 of the receiving network device can be configured to ensure transmission of packet acknowledgement messages are not delayed to the extent that the delay causes a congestion window timeout value to be exceeded, as such an occurrence can cause a more significant reduction in transmission rates than desired.

The method 900 further includes the network interface driver 120 storing an identifier associated with the packet acknowledgement message in a time-indexed data structure at a position in the time-indexed data structure associated with the transmission time determined for the packet acknowledgement message (stage 940). One example of a suitable time-indexed data structure is the timing wheel 130 described above.

The method 900 also includes determining that a time indexed in the time-indexed data structure has been reached (stage 950). In some implementations, the network interface driver 120 may determine that a specific transmission time associated with a packet acknowledgement message identifier stored in the time-indexed data structure 130 has been reached. The network interface driver 120 may query the time-indexed data structure 130 with the current time to determine whether there are any packet acknowledgement message that are to be transmitted. For example, the network interface driver 120 may query the data structure using the current CPU clock time (or some other reference time value such as regularly incremented integer value).

As further shown in FIG. 9, the network device 110 transmits, over a network interface card 140, a packet acknowledgement message associated with an identifier stored in the time-indexed data structure at a position associated with the reached time (stage 960). In some implementations, the network interface driver 120 may transmit a packet acknowledgement message stored in memory 115 to network interface card 140 based on the reaching (or passing) of the transmission time identified in the packet acknowledgement message identifier that was stored in the time-indexed data structure 130.

While described above as two distinct rate limiting techniques, in some implementations, network devices may implement both the transmitter-side rate limiting processes described above, as well as the receiver-side rate limiting processes. That is, a network device may use a time-indexed data structure similar to the timing wheel 130 and a network interface driver similar to the network interface driver 120 to schedule the transmission of new data packets originated at the network device 110, as well as to schedule the transmission of packet acknowledgement messages. Network devices so configured can execute their own rate limiting policies while also effecting rate limiting on network devices that are not executing their own rate limiting processes.

In addition, while the receiver-side rate limiting techniques described above are described as being implemented in connection with the TCP transport protocol, such functionality can be implemented in connection with other transport protocols that require explicit confirmation of packet receipt, or at other layers of the network protocol stack without departing from the scope of the disclosure.

FIG. 10 is a block diagram illustrating a general architecture for a computer system 1000 that may be employed to implement elements of the systems and methods described and illustrated herein, according to an illustrative implementation.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 1022 may have one or more network interface driver ports to communicate with the connected devices or components. Generally, a processor 1050 will execute instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1000 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown in FIG. 3 and FIG. 5 can be implemented within the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1000 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 1010 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A network device, comprising:
   a network interface card,
   at least one processor,
   a memory; and
   a network interface driver comprising computer-readable instructions executing on the at least one processor configured to:
   receive packets at a packet layer of the network device from a plurality of applications executing on the network device;
   prevent one of the applications executing on the network device from sending additional packets to the packet layer for transmission until the application receives a transmission completion notification indicating a packet previously forwarded by the application to the packet layer of the network device has been transmitted;
   process, by a scheduling module, the received packets to determine a transmission time for each packet based on at least one rate limit policy;
   for each of the packets to be transmitted, store an identifier associated with the respective packet in a time-indexed data structure at a position in the time-indexed data structure associated with the transmission time determined for the packet;
   determine, by the scheduling module, that a time indexed in the time-indexed data structure has been reached, and in response, transmitting by the network interface card a packet associated with an identifier stored in the time-indexed data structure at a position associated with the reached time; and
   subsequent to the network interface card transmitting the packet, communicate a transmission completion notification back to the application executing on the network device from which the packet was received at the packet layer.

2. The network device of claim 1, wherein the network interface driver is further configured to receive a predetermined number of packets from one of the plurality of applications prior to preventing such application from sending additional packets for transmission.

3. The network device of claim 1, wherein the network interface driver is further configured to receive packets from a plurality of applications executing in one of virtual machines, container execution environments, or a combination of virtual machines and container execution environments.

4. The network device of claim 1, wherein the network interface driver is further configured determine a transmission time for each packet based on a rate pacing policy or a target rate limit.

5. The network device of claim 4, wherein the rate pacing policy further includes a packet class rate policy and/or an aggregate rate policy.

6. The network device of claim 5, wherein the rate pacing policy further includes a weighted fair queueing policy to process multiple packet flows.

7. The network device of claim 1, wherein the network interface driver is further configured to receive packets including a requested transmission time assigned to the packet by one of the plurality of applications before being received at the packet layer and before being processed by the scheduling module.

8. The network device of claim 7, wherein the network interface driver is further configured to determine an updated transmission time based on at least one rate limit policy being exceeded and invoking a rate limit algorithm associated with the received packet.

9. The network device of claim 8, wherein the network interface driver is further configured to find the associated rate limit algorithm using a hash table or a mapping identifying a rate limit algorithm associated with the received packet.

10. The network device of claim 1, wherein the network interface driver executing computer-readable instructions is implemented on a dedicated CPU core.

11. The network device of claim 1, wherein the network interface driver is further configured to identify a transmission time older than now and in response to the determining, transmitting the packet by the network interface card.

12. A method, comprising:
    receiving packets at a packet layer of a network host from a plurality of applications executing on the network host;
    preventing one of the applications executing on the network host from sending additional packets to the packet layer for transmission until the application receives a transmission completion notification indicating a packet previously forwarded by the application to the packet layer of the network host has been transmitted;
    processing, by a scheduling module, the received packets to determine a transmission time for each packet based on at least one rate limit policy;
    for each of the packets to be transmitted, storing an identifier associated with the respective packet in a time-indexed data structure at a position in the time-indexed data structure associated with the transmission time determined for the packet;
    determining, by the scheduling module, that a time indexed in the time-indexed data structure has been reached, and in response, transmitting by a network interface card a packet associated with an identifier stored in the time-indexed data structure at a position associated with the reached time; and
    subsequent to the network interface card transmitting the packet, communicating, a transmission completion notification back to the application executing on the network host from which the packet was received at the packet layer.

13. The method of claim 12, wherein, prior to preventing one of the applications from sending additional packets for transmission, receiving a predetermined number of packets from such application.

14. The method of claim 12, wherein the received packets comprise packets received from a plurality of applications executing in one of virtual machines, container execution environments, or a combination of virtual machines and container execution environments.

15. The method of claim 12, wherein the at least one rate limit policy further includes a rate pacing policy or a target rate limit.

16. The method of claim 15, wherein the rate pacing policy further includes a packet class rate policy and/or an aggregate rate policy.

17. The method of claim 16, wherein the rate pacing policy further includes a weighted fair queueing policy to process multiple packet flows.

18. The method of claim 12, wherein the transmission time for at least one packet is based on a requested transmission time assigned to the packet by one of the plurality of applications before being received at the packet layer and before being processed by the scheduling module.

19. The method of claim 12, wherein determining a transmission time for each packet further comprises:
   determining an updated transmission time based on at least one rate limit policy being exceeded and invoking a rate limit algorithm associated with the received packet.

20. The method of claim 19, wherein the algorithm used to find the associated rate limit algorithm includes a hash table or a mapping identifying a rate limit algorithm associated with the received packet.

21. The method of claim 12, wherein the method is implemented in computer-readable executable instructions on a dedicated CPU core.

22. The method of claim 12, wherein in determining a transmission time for each packet further comprises:
   identifying a transmission time older than now and in response to the determining, transmitting the packet by the network interface card.

\* \* \* \* \*